US011096114B2

(12) United States Patent
Rune et al.

(10) Patent No.: US 11,096,114 B2
(45) Date of Patent: Aug. 17, 2021

(54) METHODS AND APPARATUS FOR UPDATING SYSTEM INFORMATION

(71) Applicant: Telefonaktiebolaget LM Ericsson (publ), Stockholm (SE)

(72) Inventors: Johan Rune, Lidingö (SE); Jens Bergqvist, Linköping (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/318,242

(22) PCT Filed: Dec. 21, 2018

(86) PCT No.: PCT/SE2018/051363
§ 371 (c)(1),
(2) Date: Jan. 16, 2019

(87) PCT Pub. No.: WO2019/139525
PCT Pub. Date: Jul. 18, 2019

(65) Prior Publication Data
US 2020/0084698 A1    Mar. 12, 2020

Related U.S. Application Data

(60) Provisional application No. 62/616,200, filed on Jan. 11, 2018.

(51) Int. Cl.
*H04W 48/10* (2009.01)
*H04W 48/12* (2009.01)
*H04W 68/00* (2009.01)

(52) U.S. Cl.
CPC ............ *H04W 48/10* (2013.01); *H04W 48/12* (2013.01); *H04W 68/005* (2013.01)

(58) Field of Classification Search
CPC ........ H04L 27/26; H04W 4/80; H04W 72/04; H04W 68/02; H04W 72/1273; H04W 4/90
See application file for complete search history.

(56) References Cited

U.S. PATENT DOCUMENTS 9,326,207 B2 * 4/2016 Jha .................. H04W 48/16
2009/0310503 A1 * 12/2009 Tenny ................ H04W 68/00
370/252

(Continued)

FOREIGN PATENT DOCUMENTS

RU        2518221 C2    6/2014

OTHER PUBLICATIONS

Unknown, Author, "Change of System Information in NR", Ericsson, 3GPP TSG-RAN WG2 #100, R2-1712486, Reno, Nevada, USA, Oct. 27-Dec. 1, 2017, 1-3.

(Continued)

*Primary Examiner* — Iqbal Zaidi
(74) *Attorney, Agent, or Firm* — Murphy, Bilak & Homiller, PLLC

(57) ABSTRACT

According to embodiments described herein there is provided methods and apparatus for receiving notifications at a wireless device from a base station of upcoming system information (SI) updates. The wireless device is communicating with the base station using a contiguous subset of physical resources on a first carrier. A method in a wireless device comprises obtaining an indication of a subset of a plurality of paging occasions in a SI modification period that the wireless device is configured to monitor, wherein responsive to an upcoming update of SI the base station is configured to transmit a notification on each of the plurality of paging occasions in the SI modification period; and (Continued)

monitoring the subset of the plurality of paging occasions for notifications of upcoming SI updates.

19 Claims, 19 Drawing Sheets

(56) References Cited

U.S. PATENT DOCUMENTS

| | | |
|---|---|---|
| 2016/0205659 A1 | 7/2016 | Bergman et al. |
| 2016/0234804 A1 | 8/2016 | Hu et al. |
| 2019/0174529 A1* | 6/2019 | Tie ..................... H04W 68/005 |

OTHER PUBLICATIONS

Unknown, Author , "Notification and retrieval of updated SI for a UE in an active DL BWP", Ericsson, 3GPP TSG-RAN WG2 NR AH#3, R2-1800294, Vancouver, Canada, Jan. 22-26, 2018, 1-6.
Unknown, Author , "Offline summary for AI 7.1.3 on Paging for NR", Huawei, HiSilicon, 3GPPTSG RAN WGI Meeting 90bis, R1-1719037, Prague, Czech Republic, Oct. 9-13, 2017, 1-5.
Unknown, Author , "The Impact of Bandwidth Part on RAN2: Overview and Issues", Samsung, 3GPP TSG RAN WG2 #99bis, R2-1711595, Prague, Czech Republic, Oct. 9-13, 2017, 1-8.

* cited by examiner

1302
Receive an indication of an upcoming SI update from the base station; wherein the indication is received on physical resources within the contiguous subset of physical resources.

Fig. 13

1502
Transmit an indication of an upcoming SI update to the wireless device; wherein the indication is transmitted on physical resources within the contiguous subset of physical resources.

Fig. 15

METHODS AND APPARATUS FOR UPDATING SYSTEM INFORMATION

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

An important property of the 5G system (e.g. New Radio (NR)) is the usage of high carrier frequencies, e.g. in the range 6-100 GHz. For such a high frequency spectrum, the atmospheric, penetration and diffraction attenuation properties may be much worse than for lower frequency spectrums. In addition, the receiver antenna aperture, as a metric describing the effective receiver antenna area that collects the electromagnetic energy from an incoming electromagnetic wave, is inversely proportional to the frequency, i.e., the link budget (accounting of all of the gains and losses from the transmitter, through the medium (free space, cable, waveguide, fiber, etc.) to the receiver in a telecommunication system) may be worse for the same link distance even in a free space scenario, if omnidirectional receive and transmit antennas are used. This motivates the usage of beamforming to compensate for the loss of link budget in high frequency spectrum. This is particularly important when communicating with wireless devices which have poor receivers, for example, low cost/low complexity wireless devices. Other means for improving the link budget may include repetition of the transmissions (e.g. to allow wide beam or omnidirectional transmission) or use of Single Frequency Network (SFN) transmission from multiple transmission/reception points in the same or different cells.

For the 5G system currently being standardized by 3GPP (where the radio access network is referred to as New Radio (NR) and the core network is referred to as Next Generation Core (NGC)) 3GPP has agreed to partly change the principles for distribution of system information (SI) that are used in Long Term Evolution (LTE).

For NR it has been decided to divide the SI into "minimum SI" and "other SI", where the minimum SI is the SI that may be required to access the cell, and, in the case of NR stand-alone mode (i.e. not in dual connection configuration with LTE), the minimum SI also contains scheduling information for the SIBs of the other SI. The minimum SI consists of the Master Information Block (MIB) and System Information Block type 1 (SIB1), SIB1 is also referred to as "Remaining Minimum System Information" (RMSI). At least in NR stand-alone mode, the minimum SI may be periodically broadcast in a cell, while the other SI may be either periodically broadcast or delivered on demand, e.g. triggered by a random access preamble (also referred to as Msg1) or a random access message 3 (also referred to as Msg3) from a UE in RRC_IDLE or RRC_INACTIVE state or requested via dedicated RRC signaling from a UE in RRC_CONNECTED state. If random access preamble (Msg1) transmissions are used, there may be different preambles for requesting different parts (e.g. SI message(s) and consequently the SIB(s) allocated to the SI message(s)) of the other SI. If random access message 3 (Msg3) transmissions are used, a UE may in such a message specify which parts ((e.g. SI message(s) and consequently the SIB(s) allocated to the SI message(s)) of the other SI the UE wants the network to broadcast/transmit.

FIG. 1 illustrates the message sequence of the Msg1 solution for requesting broadcast/transmission of other SI. With the Msg1 solution, reception of one of the concerned dedicated preambles triggers the network to broadcast the requested SIB(s) in accordance with scheduling information in the minimum SI. The network, for example, a gNB, also transmits a Msg2 to the requesting UE, in response to the Msg1, confirming the successful reception of the Msg1 and confirming that the requested SI will be broadcast. When a UE uses the Msg1 method for request of on-demand SI, it selects the preamble associated with the desired on-demand SI (as specified in the minimum SI) and transmits this preamble to the network using PRACH resources. The UE then awaits the confirming Msg2 (during a Msg2 window) and after receiving the confirming Msg2 the UE monitors the downlink for the broadcast of the requested SI in accordance with the scheduling information for the requested SI, as indicated in the minimum SI (in SIB1). The procedure is illustrated in FIG. 1 below.

FIG. 2 illustrates the message sequence of the Msg3 solution for requesting broadcast/transmission of other SI. With the Msg3 solution the request procedure begins like a regular random access procedure—i.e. the UE transmits one of the regular (non-dedicated) preambles in Msg1 and receives a regular Msg2 in response, where the Msg2, as any regular Msg2, allocates uplink transmission resources for transmission of Msg3, as well as provides a timing advance indication to enable the UE to transmit Msg3 with correct timing. The SI request included in Msg3 triggers the network to broadcast/transmit the parts of the other SI that are specified in the Msg3 from the UE in accordance with scheduling information in the minimum SI. The network, e.g. the gNB also transmits a Msg4 confirming the successful reception of the Msg3 and confirming that the requested SI will be broadcast. When a UE uses the Msg3 method for request of on-demand SI, it randomly selects one of the regular non-dedicated preambles (as specified in the minimum SI) and transmits this preamble to the network using PRACH resources. The UE then awaits Msg2 (during a Msg2 window) and after receiving the Msg2 the UE transmits Msg3 (using timing advance and uplink transmission resources as indicated in Msg2) and monitors the downlink for the confirming Msg4. After receiving the confining Msg4, the UE monitors the downlink for the broadcast of the requested SI in accordance with the scheduling information for the requested SI, as indicated in the minimum SI (in SIB1). The procedure is illustrated in FIG. 2.

The scheduling information for SI transmissions included in SIB1 is not precise and does not include specific resource allocations, as a scheduling allocation on the PDCCH. The information in SIB1 allocates SIBs to SI messages and only SIBs with the same periodicity can be allocated to the same SI message. Furthermore, each SI message has an associated SI window, which recurs with different periodicity for different SI messages (but which has the same length for all SI messages). The base station broadcasts a certain SI message at some point within the SI window associated with the SI message. The UE can identify a SI message transmission from the scheduling allocation on the PDCCH, which is addressed to a for this purpose dedicated RNTI denoted SI-RNTI (i.e. the SI-RNTI is encoded into the CRC of the DCI carrying the scheduling allocation)

It has also been decided to transmit a broadcast channel, denoted NR-PBCH (a.k.a. PBCH), following a periodic synchronization signal (for example, consisting of two parts NR-PSS and NR-SSS (a.k.a, PSS and SSS) from which the Physical Cell Identity (PCI) can be derived). Together, the NR-PSS+NR-SSS+NR-PBCH may form an entity denoted SS Block. Some of the minimum SI will be broadcast on the NR-PBCH, e.g. the denoted Master Information Block (MIB or NR-MIB), while the remaining minimum SI (RMSI) may be periodically broadcast on another channel, for example, using a NR-PDCCH/NR-PDSCH (a.k.a. PDCCH/PDSCH) structure, i.e. with a scheduling allocation transmitted on the NR-PDCCH, allocating transmission resources on the NR-PDSCH, where the actual RMSI is transmitted. According to further agreements in 3GPP, information enabling a UE to receive the NR-PDCCH/NR-PDSCH carrying the RMSI may be transmitted on the NR-PBCH. More specifically, configuration parameters for the NR-PDCCH utilized for the RMSI is provided in the MIB, possibly complemented by parameters derived from the PCI. A further 3GPP agreement for release 15 concerning RMSI transmission is that the RMSI transmissions may be spatially Quasi Co-Located (QCL) with the SS Block transmissions. A consequence of the QCL property is that the NR-PSS/NR-SSS transmission may be relied on for accurate synchronization to be used when receiving the NR-PDCCH/NR-PDSCH carrying the RMSI The basic principles for SI updates may be the same in NR as in LTE. For example, the SI updates may be built around the concept of SI modification periods. In other words, with some exceptions, SI may only be updated at the border between two SI modification periods. Furthermore, a planned SI update may have to be announced in the SI modification period prior to an actual SI update. Such announcements may be performed using Paging messages, for example, a Paging message may be used to inform UEs in RRC_IDLE, UEs in RRC_INACTIVE and UEs in RRC_CONNECTED states about a corning system information change. If the UE receives a Paging message including an indication of an upcoming SI update, for example a systemInfoModification parameter, it knows that the system information will change at the next SI modification period boundary.

A special case of SI update notification via paging is when an etws-indication parameter or cmas-Indication parameter in the Paging message indicates that a public warning system message (ETWS or CMAS) has been activated in the SI. In this case, the UE knows that the update is applicable immediately and the UE may as soon as possible acquire and read the SIB(s) related to the public warning indicted in the paging message. The same applies when the Paging message contains an eab-ParamModification indication.

In NR, the notion of Bandwidth Part (BWP) is introduced. A BWP defines a continuous part of the full carrier bandwidth, in other words a contiguous subset of physical resources on a particular carrier. It may be defined separately for uplink (UL) and downlink (DL). The motivation for introduction of this concept is that it facilitates support of configurations for UEs which do not support the full bandwidth, e.g. low-complexity, narrowband UEs and is more lightweight than a fully-fledged cell. In addition, configuring multiple DL BWPs on a carrier may speed up a wideband UE's measurements on all the beams in an SS Block beam sweep if each configured DL BWP provides a SS Block beam sweep with shifted beam directions (i.e. simultaneous SS Block transmissions are performed in different beam directions in different DL BWPs).

A BWP may only be configured for a UE in RRC_CONNECTED state, i.e. other than an initial BWP (one for UL and one for DL), a BWP only exists for UEs in RRC_CONNECTED state. To support the initial data exchange between the UE and the network, e.g. during the process of moving a UE from RRC_IDLE or RRC_INACTIVE state to RRC_CONNECTED state, the initial DL BWP and initial UL BWP are configured in the minimum SI. The initial DL BWP corresponds to the Control-resource set (CORESET) of the RMSI (SIB1) transmission (i.e. the DL transmission resources on which the PDCCH for the RMSI transmission may be transmitted/broadcast). A UE may also be configured with a default DL BWP, to which it switches if has problem with the radio link on the configured active DL BWP or an inactivity timer expires.

A DL BWP may or may not contain SS Block transmissions. In any case, there may always be a single cell defining SS Block (i.e. SS Block broadcast, possibly in the form of multiple SS Block transmissions in a beam sweep).

There currently exist certain challenge(s). The BWP concept is designed for UEs in RRC_CONNECTED state, and a BWP does not necessarily comprise a paging channel and a channel for SI broadcast. Hence, there is a need for an efficient solution for notification and retrieval of updated SI as well as Earthquake and Tsunami Warning System (ETWS) information, Commercial Mobile Alert System (CMAS) information, and/or Extended Access Barring (EAB) information. Please note that emergency information, such as ETWS and CMAS information, belongs to the overall system information, even if it is herein often described as if it was something separate from the system information.

The lack of support for SI update notifications and notifications of activated ETWS/CMAS information for a UE using an allocated BWP (one for DL and one for UL) in RRC_CONNECTED state implies problems in terms of efficiency and availability for communication. If a UE must leave its allocated DL BWP to monitor paging occasions (POs) on other frequencies (where the paging channel is configured) this implies gaps in the UE's availability, i.e. during these POs the UE is not available for DL transmissions.

Furthermore, if the UE receives a notification of updated SI or presence of ETWS/CMAS information, the UE may be required to leave its DL BWP for a potentially significant time to receive the updated SI or ETWS/CMAS information. This may involve receiving SIB1 (which may require a prior reception of the MIB, or the UE may have previously received and stored the MIB content and may rely on the therein contained channel configuration for the SIB1 transmission when receiving SIB1) to read the per SIB value tags to find out which SIB(s) that has/have been updated, and also the relevant scheduling information for the concerned SIB(s). Then, unless only SIB1 was updated, the UE must receive the updated SIB(s) in accordance with the scheduling information in SIB1. The reception of SIBs other than SIB1 requires that the UE is prepared to monitor the entire SI window(s) of the concerned SIB(s). Hence, the time the UE must be away from its allocated DL BWP in order to retrieve the updated SI/ETWS/CMAS may be unacceptably long, considering that while this is ongoing the UE cannot receive any other DL data.

Certain aspects of the present disclosure and their embodiments may provide solutions to these or other challenges. The solutions provide efficient mechanisms for notification and retrieval of updated SI as well as ETWS/CMAS (and possibly EAB) information. This is achieved while minimizing or eliminating an RRC_CONNECTED UE's need to leave its configured DL BWP to monitor and receive Paging messages with SI/ETWS/CMAS update notifications as well as to retrieve possible updated SI.

The mechanisms include either to provide the necessary information within the UE's configured DL BWP or to provide the UE with information that allows it to retrieve the required information, spending a minimal time outside its configured BWP.

There are, proposed herein, various embodiments which address one or more of the issues disclosed herein.

Certain embodiments may provide one or more of the following technical advantage(s). The solutions provide mechanisms to minimize or eliminate an RRC_CONNECTED UE's need to leave its configured DL BWP to monitor and receive Paging messages with SI/ETWS/WAS update notifications as well as to retrieve possible updated SI. Hence, the solutions provide efficient mechanisms for notification and retrieval of updated SI as well as ETWS/CMAS (and possibly EAB) information.

BRIEF DESCRIPTION OF THE DRAWINGS

FIG. 3 illustrates a wireless network in accordance with some embodiments;

FIG. 4 illustrates a User Equipment in accordance with some embodiments;

FIG. 13 illustrates a method in accordance with some embodiments;

FIG. 15 illustrates a method in accordance with some embodiments;

DESCRIPTION

Figure 1:
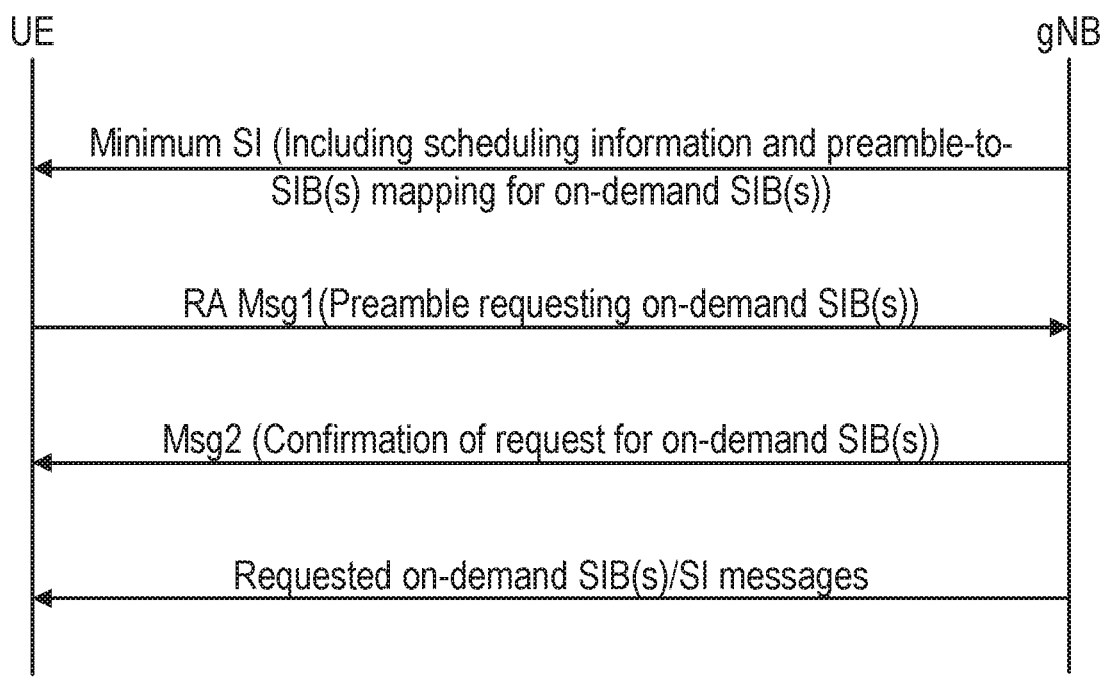
Figure 2:
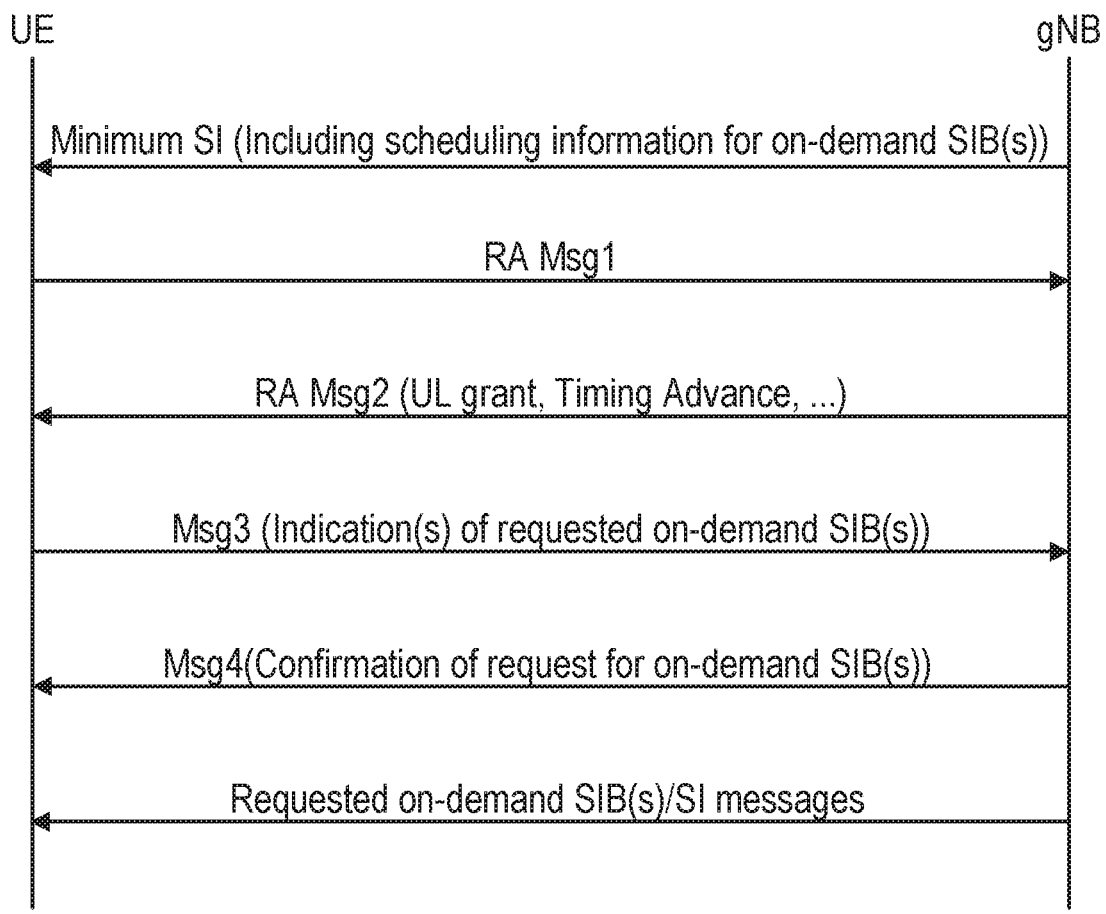

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The aforementioned problems associated with the two reception operations, i.e., reception of SI update (including ETWS/CMAS) notifications and reception of updated SI (including ETWS/CMAS information) may addressed with a embodiments as described below.

A first embodiment relates to monitoring a subset of paging occasions (POs) outside of the BWP. In this embodiment, a wireless device (or UE) may be communicating with a base station using a BWP, in other words a contiguous subset of physical resources on a first carrier. The wireless device may be configured to obtain an indication of a subset of a plurality of paging occasions in a SI modification period that the wireless device is configured to monitor, wherein responsive to an upcoming update of SI the base station is configured to transmit a notification on each of the plurality of paging occasions in the SI modification period; and monitor the subset of the plurality of paging occasions for notifications of upcoming SI updates.

In other words, even if a wireless device is forced to leave its DL BWP to monitor POs for potential SI/ETWS/CMAS update notifications, it may not have to monitor all of them. Provided that the wireless device can rely on the base station to transmit the Paging message in all POs in the SI modification period, it may be sufficient that the wireless device monitors just a subset of the POs in each SI modification period, for example a single PC in each SI modification period. The wireless device could for example, monitor the last PO in each SI modification period, which would contain any relevant paging message even if the base station does not transmit the Paging message in the early POs of the SI modification period as the SI update has not yet been confirmed.

However, monitoring a subset of the POs, which may be for example, evenly distributed in the SI modification period, may also be an option. This may be used in order to catch any ETWS/CMAS update notification earlier. Different wireless devices may have different uses for ETWS/CMAS update notifications. For instance, certain MTC devices may not have any use at all for such a notification, while it may be of extreme importance for a wireless device which has a human user. Therefore, different wireless devices may employ different requirements regarding how quickly it may be required to receive a possible ETWS/CMAS update. As an example, a wireless device with a human user may choose to monitor a subset (or even all) of the POs, while some MTC devices may choose to monitor only the last PO in each SI modification period.

The base station may be configured to, responsive to an upcoming update of SI, transmit a notification indicating the upcoming update of SI on each of a plurality of paging occasions within a SI modification period; obtain an indication of a subset of the plurality of paging occasions in the SI modification period the wireless device is configured to monitor; and refrain from scheduling transmissions to the wireless device on the contiguous subset of physical resources during the subset of paging occasions In other words, the base station may not schedule any other transmission for the wireless device while the wireless device is away from its DL BWP. Therefore, it therefore be useful if the base station is aware of which PO(s) a wireless device monitors.

For example, the wireless device may transmit an indication of the subset of the plurality of paging occasions to the base station (this may be performed only once when the wireless device is configured with the DL BMP). Alternatively, the base station may configure the wireless device with instructions for which PO(s) to monitor. In some embodiments, the base station may derive the subset of the plurality of paging occasions based on capability and/or category information associated with the wireless device. In other words, if the wireless device is a Machine Type Communication (MTC) device with no human user, the base station may determine that the subset of the plurality of paging occasions comprises only the last paging occasion of each SI modification period.

However, in some embodiments, an indication of an upcoming SI update may be transmitted to the wireless device using physical resources which are within the contiguous subset of physical resources that the wireless device is using to communicate with the base station.

For example, the indication may comprise a paging message transmitted on a dedicated paging channel within the contiguous subset of physical resources, i.e. the DL BWP for a particular wireless device. In this embodiment, a paging channel is configured for each DL BWP and this paging channel can be used for a Paging message notifying about SI/ETWS/CMAS (and possibly EAB parameters) updates in the regular way. This means that the wireless device does not have to leave its DL BWP to receive the notification.

In some embodiments, the indication is transmitted to a plurality of wireless devices communicating with the base station using the contiguous subset of physical resources, and the indication is transmitted during each of a plurality of paging occasions within a SI modification period.

However, the circumstances associated with a DL BWP may be utilized to optimize this embodiment. In other words, the fact that wireless devices allocated to a DL BWP are all in a connected, e.g RRC_CONNECTED, state means that the network is aware of each one of them. Therefore, the base station does not have to be limited to transmitting Paging messages in paging occasions (POs), but can transmit them at any time when it knows that one or more wireless device(s) is/are listening. For example, in some embodiments the indication is transmitted to a plurality of wireless devices communicating with the base station using the contiguous subset of physical resources, and the indication is transmitted during a time period during which the base station is aware that one or more of the plurality of wireless devices is monitoring the contiguous subset of physical resources.

When doing this, the base station may take possible RRC_CONNECTED state Discontinuous Reception (DRX) configurations and measurement gap configurations for involved wireless devices into account to make sure that each wireless device receives the paging message at least once (or maybe more than once for redundancy reasons). This way, the base station may be able to reduce the number of transmissions required and potentially all wireless devices may receive the paging message faster. The Paging message comprising the SI/ETWS/CMAS update notification may optionally also comprise information about which SIB(s) that is/are affected and/or the new value tag(s) for the updated SIB(s).

In some embodiments, a direct indication style PDCCH-only paging notification within the DL BWP may be used. For example, the indication may comprise a message transmitted on a physical downlink control channel (PDCCH) within the contiguous subset of physical resources.

For example, wireless devices may be notified within the DL BWP using the direct indication style notification of LTE, which corresponds to Downlink Control information (DCI)/Physical Downlink Control Channel (PDCCH)-only paging in NR. This confines the transmission to the PDCCH, which may be a PDCCH configured for common signaling in the DL BWP. As described above, the base station may adhere to POs for these transmissions or transmit them at any time when it knows that wireless devices are listening (taking any RRC_CONNECTED state DRX configurations and measurement gap configurations into account). The wireless devices can thus receive the SI/ETWS/CMAS update notifications without leaving the DL BWP. The DCI containing the SI/ETWS/CMAS update notification may optionally also contain information about which SIB(s) that is/are affected and/or the new value tag(s) for the updated SIB(s).

In some embodiments the base station may notify each wireless device using dedicated RRC signaling. For example the indication may comprise dedicated RRC signaling. For example, since all wireless devices using the DL BWP are in a connected, e.g. RRC_CONNECTED, state, the base station may notify each wireless device allocated to the DL BWP via dedicated RRC signaling. In some examples the indication may comprise information about which SIB(s) that is/are affected and possibly also the new value tag(s) for the updated SIB(s).

Depending on the number of wireless devices using the DWP, this solution may amount to unnecessarily large signaling overhead.

In some embodiments once the wireless device has been notified of the upcoming SI update, the wireless device may be configured to receive the updated SI on physical resources outside of the BWP. In other words, the wireless device, whilst notified about the upcoming SI without having to leave the BWP may have to leave the BWP to receive the SI update.

For example, in some embodiments the indication may comprise information relating to a time period during which a message relating to the updated SI will be transmitted on physical resources outside of the wireless device's allocated BWP. For example, the indication may comprise exact timing/scheduling information for updated SI messages For example, in order to minimize the time required for a wireless device to retrieve updated SI outside the wireless device's allocated DL BWP, the base station may provide the wireless device with exact timing information for the broadcast of each updated SI message (i.e. the exact time when the SI message will be broadcast), instead of just providing a SI window for each SI message. Optionally, the timing information could be complemented by information about the frequency resources (Orthogonal Frequency Division Multiplexing (OFDM) subcarriers) that with be used for the broadcast transmission. This example may allow the wireless device to avoid receiving the scheduling allocation on the PDCCH for the transmission of an updated SI message.

This timing and possible frequency resource information may be included in the Paging message with the SI/ETWS/CMAS update notification. A possible alternative may be to include the exact scheduling information in SIB1.

In any case, proactively providing such exact scheduling/timing information may restrict the flexibility for the network to choose when to transmit a certain SI message within its associated SI window. Therefore, a possible alternative could be to provide a reduced time window, which is smaller than the full SI window, but still not an exact time, thereby leaving some of the flexibility for the base station to choose the transmission time with short notice. When a reduced time window is used instead of an exact time, it may be preferable not to include any frequency resource information, but to rely on the wireless device to receive the scheduling allocation on the concerned PDCCH.

In some examples, the new per SIB value tag(s) for the updated SIB(s) may be provided in the Paging message containing the SI/ETWS/CMAS update notification. Another alternative may be to include the new value tag(s) in the SI message(s) on the PDSCH. Other/vise the wireless device may retrieve the new value tag(s) from SIB1. In some example, the wireless device may update its stored value tag(s) autonomously by simple sequential increase. As previously, the base station may be configured not to schedule any other transmission for the wireless device while the wireless device is away from its DL BWP. This example may serge the purpose of both informing the wireless device about the presence of updated SI and facilitating for the wireless device to receive it.

In some examples, the indication comprises a scheduling allocation for an SI message, wherein the scheduling allocation is transmitted using a physical downlink control channel within the contiguous subset of physical resources. For example, the base station may be configured to transmit SI message PDCCH scheduling allocations in all DL BWPs.

For example, the base station may be configured to transmit the scheduling allocation for every SI message containing updated SI on the PDCCH in each configured DL BWP, while the actual SI message is transmitted only on the PDSCH configured for RRC_IDLE/RRC_INACTIVE wireless devices to receive (e.g. in an initial DL BWP). With this solution, a PDCCH for common signaling may be configured in each DL BWP. In some examples, there may be some additional time between the scheduling allocation and the actual PDSCH SI message transmission outside the wireless device's DL BWP, in order to give the wireless device enough time to switch to the concerned subcarriers (e.g. reconfigure its filters and receiver algorithm parameters) in time to receive the SI message.

In this example, the wireless device may not have to decode the regular scheduling allocation on the PDCCH for the transmission of an updated SI message (e.g. in a default or initial DL BWP), since the wireless device has already been informed of the time and frequency transmission resources where the updated SI is broadcast.

A wireless device's DRX configuration may constitute an obstacle when this example is implemented. For example, if a wireless device is configured such that none of its active periods (i.e. when it is not in DRX sleep mode) coincides with the broadcast of updated SI, then the base station may have to apply further measures to resolve the situation. For example, the base station may be configured to modify or remove the wireless device's RRC_CONNECTED state DRX configuration or to deliver the updated SI to the wireless device via dedicated RRC signaling.

In some examples, the new per SIB value tag(s) for the updated SIB(s) may be provided in the DCI containing the scheduling allocation. Another alternative may be to include the new value tag(s) in the SI message(s) on the PDSCH. In some examples, the wireless device may retrieve the new value tag(s) from SIB1. In some examples, the wireless device may update its stored value tag(s) autonomously by simple sequential increase. As previously mentioned the base station may be configured to not schedule any other transmission for the wireless device while the base station is away from its DL. BWP. This example may serve the purpose of both informing the wireless device about the presence of updated SI, i.e. transmitting an indication of upcoming updated SI, and facilitating for the wireless device to receive it. In this example, the base station retains flexibility in when it may broadcast the concerned SI message, i.e. at any time within the associated SI window.

In some example, the indication may instruct the wireless device to leave its DL. BWP to receive the updated SI. For example, instead of transmitting a (proactive) scheduling allocation on the PDCCH in each configured (and active) DL BWP, as described above, the base station may transmit (on a PDCCH in each DL BWP) a simple notification which informs the wireless device that it may immediately switch its receiver to receive the bandwidth of the "default PDCCH" (i.e. the PDCCH that wireless devices in an inactive, e.g. RRC_IDLE and RRC_INACTIVE, monitor, e.g. in the initial DL BWP) and monitor the default PDCCH to receive the scheduling allocation for the broadcast transmission of the updated SI. The base station may be configured to transmit this notification early enough to ensure that the wireless devices have enough time to switch their receivers to the concerned bandwidth.

As one option, the instruction to a wireless device may be a variant of the DCI (Downlink Control Information on the PDCCH) instructing the wireless device to switch to another DL BWP. For instance, the instruction to read updated SI may be a parameter in such DCI. If used to instruct all wireless devices allocated to the DL B'v'VP simultaneously, the DCI may be transmitted on a PDCCH for common control signaling and may be addressed to a RNTI which all wireless devices allocated to the DL BWP monitor for and receives.

When transmitting the proactive notification, the base station may take into account any RRC_CONNECTED state DRX configurations of wireless devices allocated to the DL BWP. Like in the example described above, the base station may have to apply further measures if a wireless device's RRC_CONNECTED state DRX sleep periods prevent it from receiving the notification. For example, the base station may be configured to to modify or remove the wireless device's RRC_CONNECTED state DRX configuration or to deliver the updated SI to the wireless device via dedicated RRC signaling.

In this example, the base station is able to broadcast of the updated SI at any point during the SI window, whilst minimizing the time a wireless device has to spend outside its configured active DL BWP to receive updated SI. This embodiment may serve the purpose of both informing the wireless device about the presence of updated SI, i.e. by receiving the indication, and facilitating for the wireless device to receive it.

In some embodiments the base station may be configured to transmit a broadcast of the updated SI on physical resources within each BWP. For example, the base station may transmit all periodically broadcast SI in all BWPs.

For example, all periodically broadcast SI (including all periodically broadcast SI messages) may be broadcast in each of the configured DL BWPs separately. This allows a wireless device allocated to a DL BWP to receive updated SI without leaving the DL BWP.

In some embodiments the broadcast is transmitted on a subset of a plurality of paging occasions within a system information modification period. For example, if updated on-demand SI is temporarily broadcast (e.g. a few periodic transmissions) after the update, the wireless device may receive updates of all SIBs from broadcasts within the wireless device's DL BWP.

In some examples, the broadcast is transmitted responsive to receiving a request from the wireless device to transmit the updated SI. For example, if the wireless device receives a notification of upcoming SI updates, but does not receive any broadcasts updated SI, the wireless device may request the updated on-demand SIB(s), e.g. using dedicated RRC signaling.

On-demand requests for SI transmission from wireless devices in RRC_IDLE/RRC_INACTIVE state in the cell may, for example, result in broadcast of the requested SI either only on the channel defined for wireless devices in those state to monitor (e.g. within a default or initial DL BWP) or on that channel as well as in all configured DL BWPs (with wireless devices allocated to them).

In some examples, a Msg1 or Msg3 based on-demand request on a MACH resource configured for a (non-initial) UL BWP (assumedly transmitted by a wireless device in RRC_CONNECTED state allocated to that BWP) could trigger broadcast only in the corresponding DL BWP or possibly in all configured DL BWPs and on the channel configured for wireless devices in RRC_IDLE/RRC_INACTIVE state to monitor.

Although the solution to provide all SI in an equal manner in all configured DL BWPs, as described above, is straightforward, broadcasting the SI in more than one DL BWP in a cell e.g. in another DL BWP than in the initial DL BWP, has the disadvantage of being wasteful, since only wireless devices in RRC_CONNECTED state use the DL BWP and wireless devices in RRC_IDLE/RRC_INACTIVE state may be assumed to already have acquired the SI they need. Therefore, in some embodiments, the broadcast of the SI update may be only broadcast it temporarily after an update. That is, when the SI is updated, the SI is broadcast, starling at the SI modification period boundary where the SI update is executed (or immediately if the update concerns ETWS/CMAS or EAB parameters), for a limited time or a limited number of times, e.g. during a SI modification period or only once or twice.

There are different alternatives for the SI to be temporarily broadcast:
  the MIB, SIB1 and any updated other SIB(s) are temporarily broadcast,
  SIB1 and any updated other SIB(s) are temporarily broadcast,
  the MIB and any updated SIB(s) are temporarily broadcast, or
  only the updated SIB(s) (or MIB) is/are temporarily broadcast.

If the MID is broadcast, the RMSI/SIB1 transmission configuration data it contains (i.e. the configuration of the PDCCH used fort the SIB1 transmission) may be the same or different from the configuration data contained in the cell's "main" MIB, e.g. a default MIB, i.e. the MIB provided for wireless devices in RRC_IDLE or RRC_INACTIVE state in the cell defining SS Block (e.g. in the initial DL BWP). If SIB1 is broadcast, the scheduling information it contains may be the same as, or different from, the scheduling information contained in the cell's "default SI" (i.e. the SI provided for wireless devices in RRC_IDLE and RRC_INACTIVE state, e.g. in the initial DL BWP).

In some embodiments, the base station may be configured to broadcast updated ETWS/CMAS information in all DL BWPs. For example, in some embodiments only ETWS/CMAS information is broadcast in all DL BWPs. Optionally, these broadcasts may be performed only temporarily after an update of the information. Other SI information may be received at the wireless devices using any of the other methods mentioned.

In some examples, updates of SIBs/SI messages containing EAB parameters may also be broadcasts in at DL BWPs. For example EAB parameters may be broadcasted in this way if the information is of any interest for a wireless device in RRC_CONNECTED state, either because these parameters are actually applied in RRC_CONNECTED state or because they can be good for the wireless device to know in case it is switched to RRC_INACTIVE or RRC_IDLE state.

In some example, the base station may be configured to provide the updated SI via dedicated RRC signaling to each wireless device in a DL BWP. For example, the base station may provide the updated SI via dedicated signaling to each wireless device allocated to a DL BWP. Possibly, the updated SI may be provided only on request from the wireless device (using dedicated PRO signaling). If the notification of SI update contained information about which the affected SIB(s) is/are, a wireless device may choose to request the updated SI only if the updated SIB(s) is/are of interest to the wireless device. As an option, a wireless device in RRC_CONNECTED state with an active DL BWP may, via dedicated signaling, request not only SIBs that are part of the other SI, but also SIB1 (which is part of the minimum SI), and possibly even the MIB, from the network. If the wireless device receives an indication about an SI update it may thus request (and be provided with) SIB1 (and possibly the MIB) through dedicated signaling.

However, depending on the number of wireless devices allocated to the DL BWP, this solution may result in undesirably large signaling overhead. A possible variation may be that the message notifying the wireless device about the updated SI could comprise an indication of whether the wireless may retrieve the updated SI via broadcast or dedicated RRC signaling, thereby giving the base station a possibility to choose delivery method based on the number of wireless devices allocated to the DL BWP. This example, may serve the purpose of both informing the wireless device about the presence of updated SI and facilitating for the wireless device to receive it.

In some examples the base station may be configured to provide updated ETWS/CMAS information via dedicated RRC signaling to each wireless device in a DL BWP. In these examples, the base station may be configured to provide updated ETWS/CMAS information (and possibly updated EAB parameters) to each wireless device in a DL BWP using dedicated RRC signaling. Other SI updates may be provided using any of the other herein described solutions.

Since, in some examples, not all wireless devices are interested in ETWS/CMAS information, the base station can use this solution selectively, e.g. transmitting the updated ETWS/CMAS information only to those wireless devices whose category/capability information indicates that they are interested in (and/or capable of) receiving such information. This may imply introducing new capability information.

Embodiments described herein thereby provide mechanisms to minimize or eliminate an RRC_CONNECTED wireless device's need to leave its configured DL BWP to monitor and receive Paging messages with SI/ETWS/CMAS update notifications as well as to retrieve possible updated SI.

The mechanisms include either to provide the necessary information within the wireless device's configured DL BWP or to provide the wireless device with information that allows it to retrieve the required information, spending a minimal time outside its configured active DL BWP.

Figure 3:
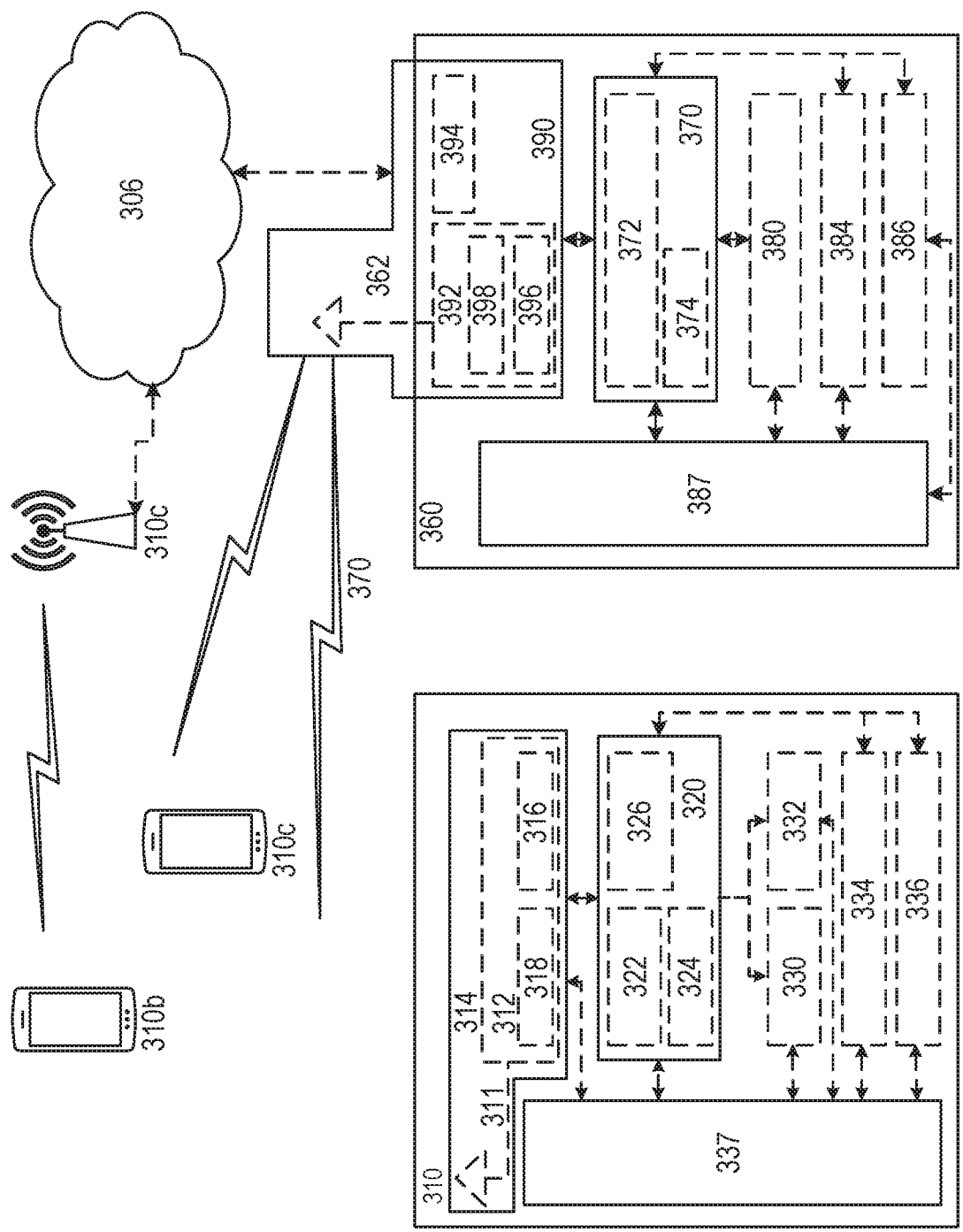
FIG. 3 illustrates the message sequence of the Msg1 solution for requesting broadcast/transmission of other SI.

FIG. 3 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. Network node 360 may be a base station as described above; and WD 310 may be a wireless device as described above. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BIS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information, obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units.

In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by am internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a LTE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interlace 314, processing circuitry 320, device readable medium 330, user interlace equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RE transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RE transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
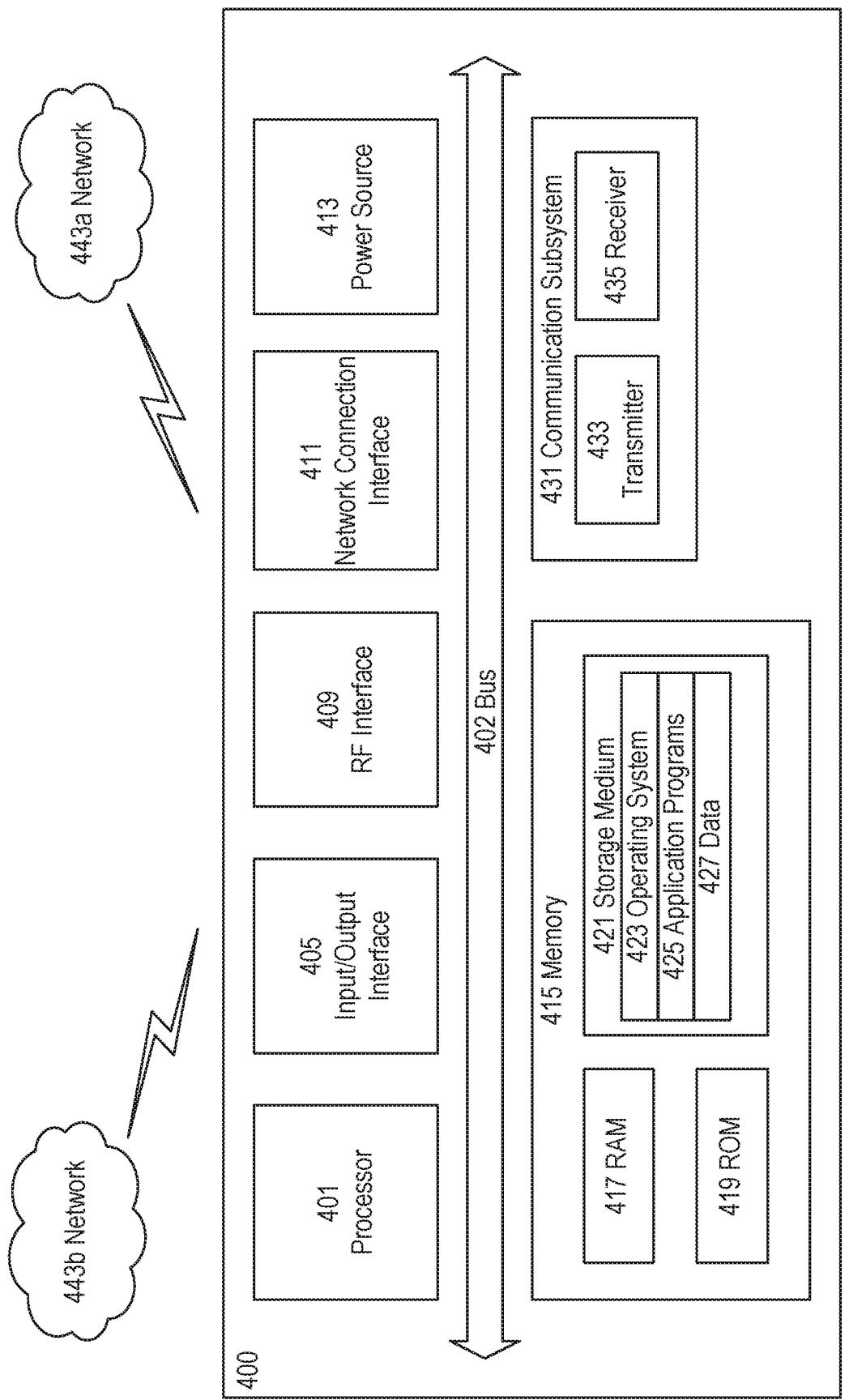
FIG. 4 illustrates the message sequence of the Msg3 solution for requesting broadcast/transmission of other SI.

FIG. 4 illustrates a User Equipment in accordance with some embodiments.

FIG. 4 illustrates one embodiment of a UE in accordance with various aspects described herein. The UE 4200 may be a wireless device as describe in the above embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 4200 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (PIE) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HODS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or army combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
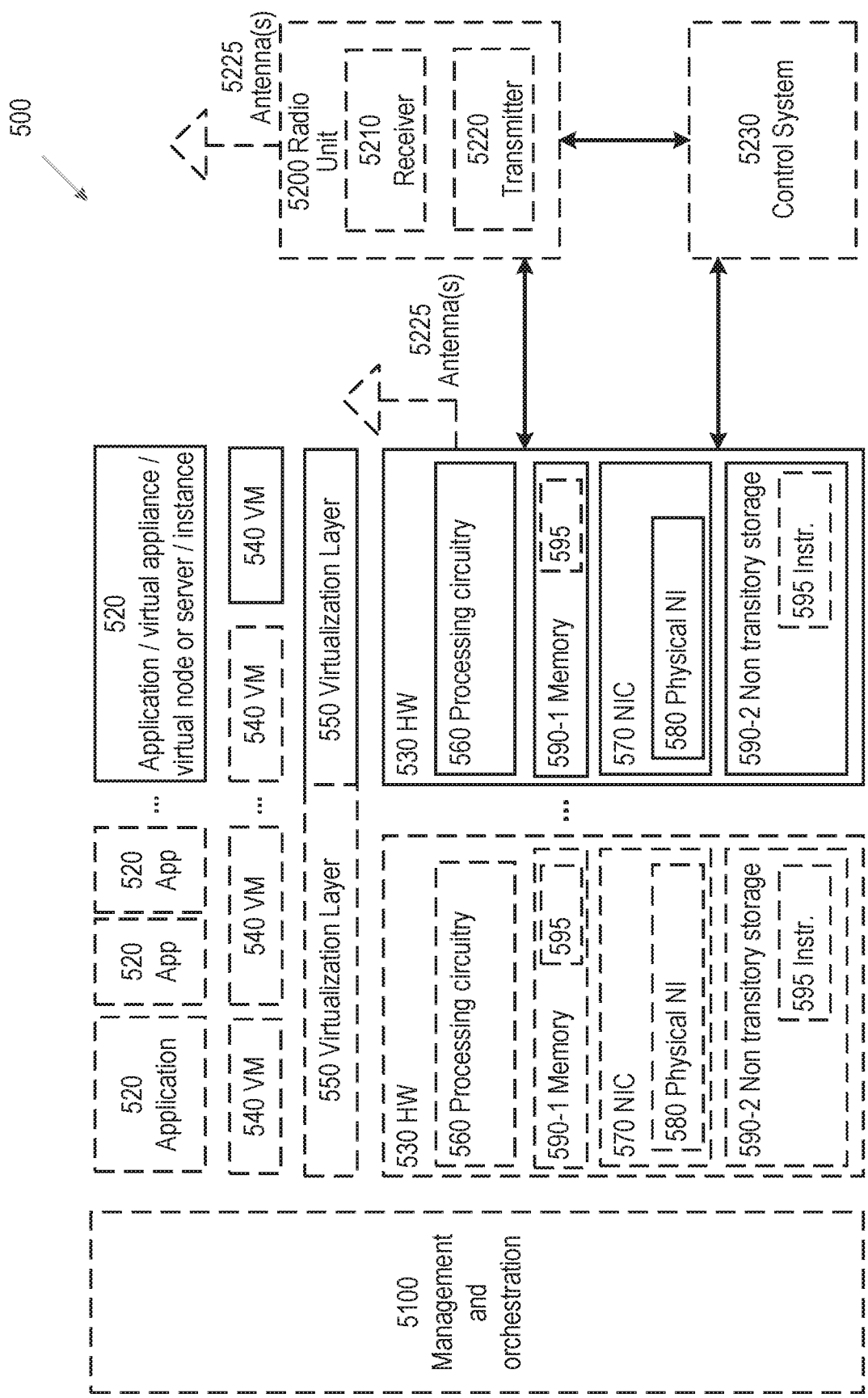
FIG. 5 illustrates a virtualization environment in accordance with some embodiments.

FIG. 5 illustrates a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CFE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
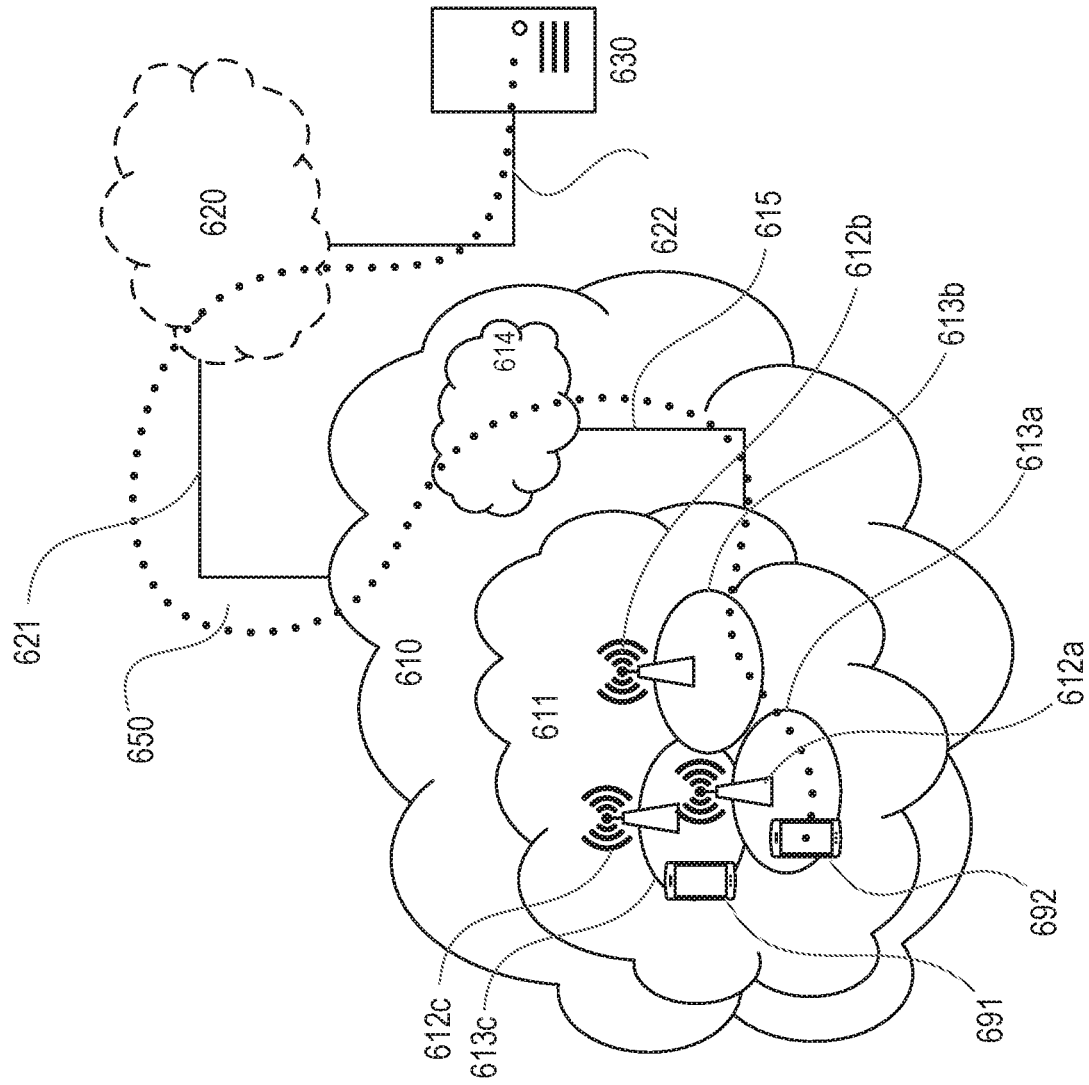
FIG. 6 illustrates a telecommunication network connected via an intermediate network to a host computer in accordance with some embodiments.

FIG. 6 illustrates a telecommunication network connected via an intermediate network to a host computer in accordance with some embodiments.

With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612h, 612c, such as NBs, eNBs, gNBs or other types of wireless access points, each defining a corresponding coverage area 613a, 613h, 613c. Each base station 612a, 612h, 612c is connectable to core network 614 over a wired or wireless connection 615. A first UE 691 located in coverage area 613c is configured to wirelessly connect to, or be paged by, the corresponding base station 612c. A second UE 692 in coverage area 613e is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of, more than one of, a public, private or hosted network; intermediate network 620, if any, may be a backbone network or the Internet; in particular, intermediate network 620 may comprise two or more subnetworks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 7:
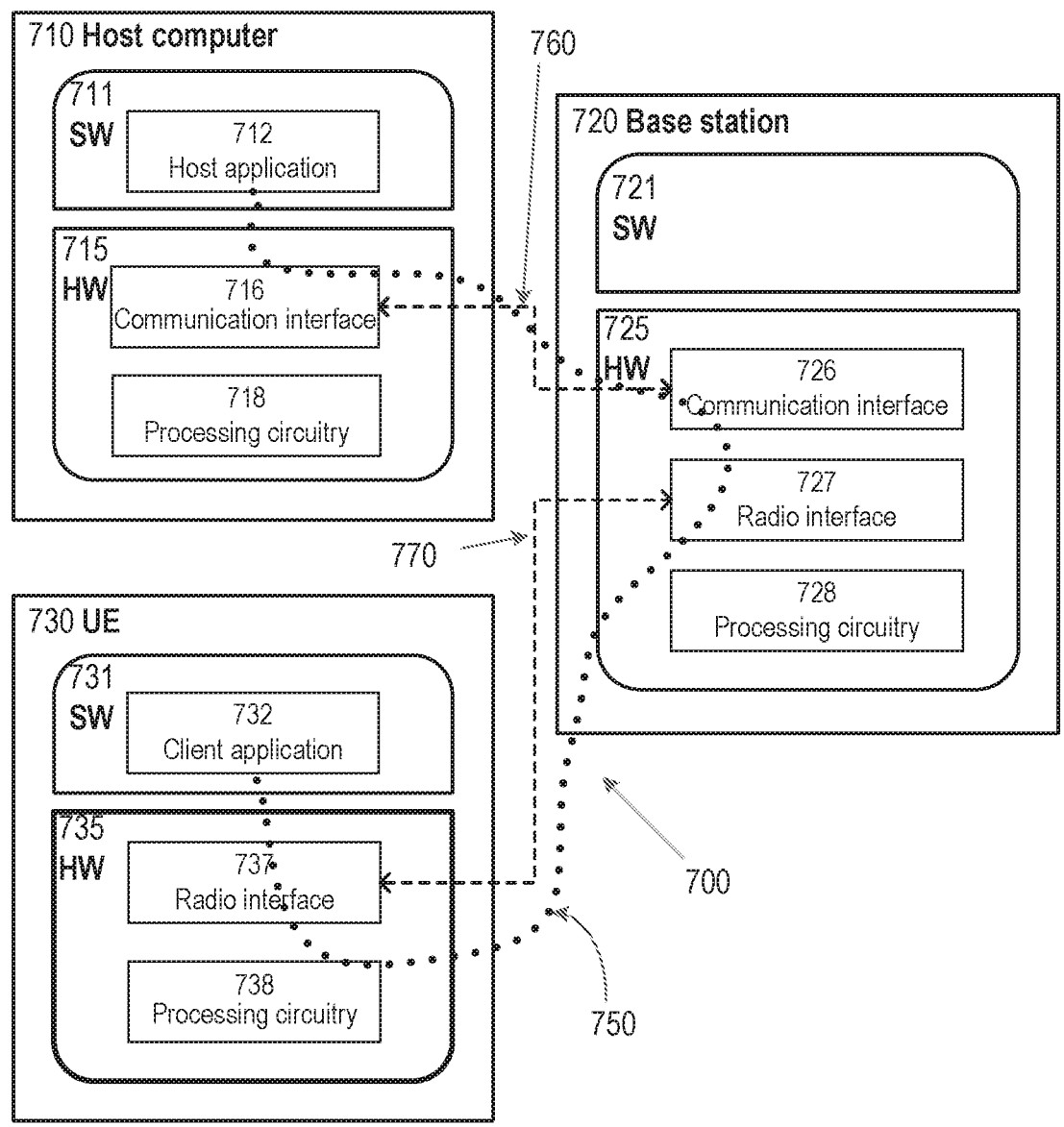
FIG. 7 illustrates a host computer communicating via a base station with a user equipment over a partially wireless connection in accordance with some embodiments.

FIG. 7 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 7 may be similar or identical to host computer 630, one of base stations 612a, 612b, 612c and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the retrieval of system information without a wireless device spending large amounts of time not receiving transmissions on its BWP, and thereby provide benefits such as improved efficiency of the wireless device.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
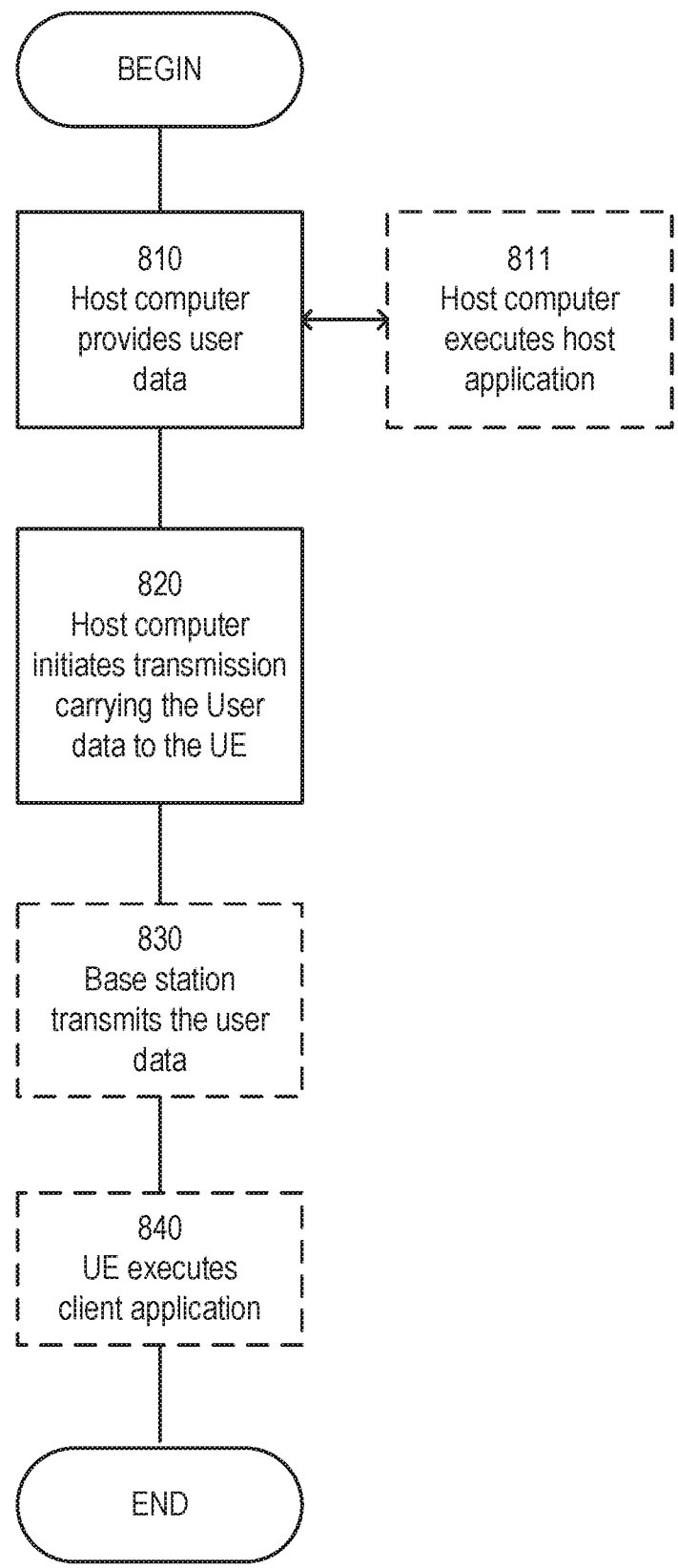
FIG. 8 illustrates methods implemented in a communication system including a host computer, a base station and a user equipment in accordance with some embodiments.

FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data in substep 811 (which may be optional) of step 810, the host computer provides the user data by executing a host application. In step 620, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
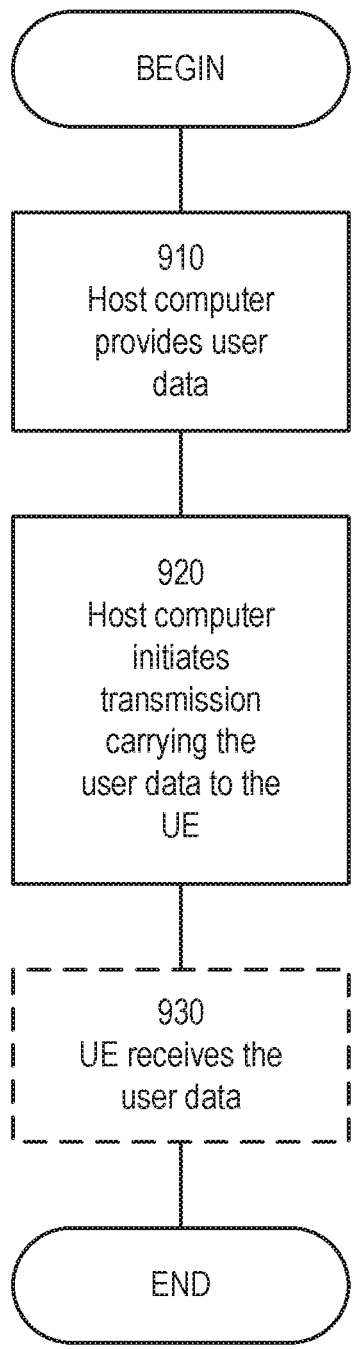
FIG. 9 illustrates methods implemented in a communication system including a host computer, a base station and a user equipment in accordance with some embodiments.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
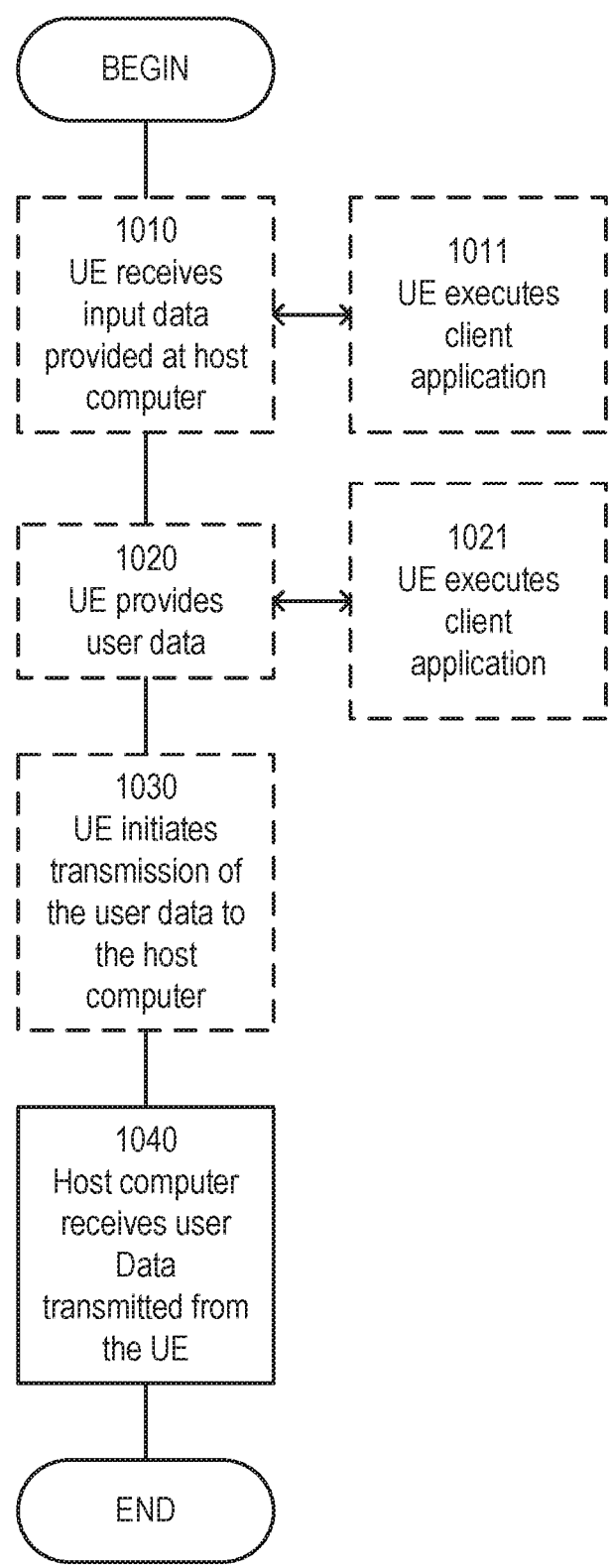
FIG. 10 illustrates methods implemented in a communication system including a host computer, a base station and a user equipment in accordance with some embodiments.

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, inn accordance with the teachings of the embodiments described throughout this disclosure.

Figure 11:
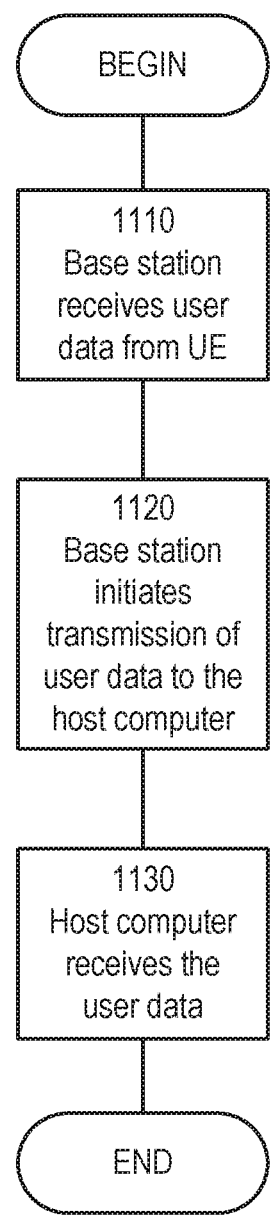
FIG. 11 illustrates methods implemented in a communication system including a host computer, a base station and a user equipment in accordance with some embodiments.

FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
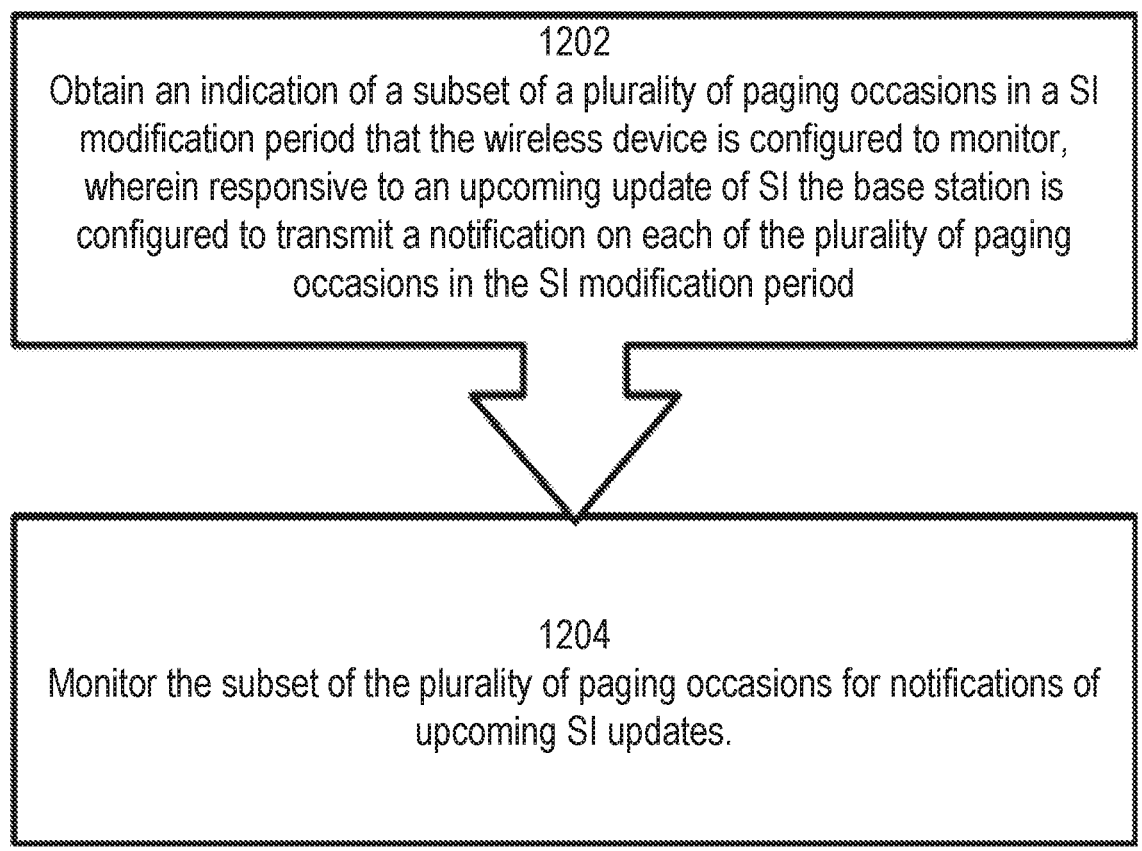
FIG. 12 illustrates a method in accordance with some embodiments.

FIG. 12 illustrates a method in accordance with some embodiments.

FIG. 12 depicts a method performed by a wireless device for receiving notifications from a base station of upcoming system information (SI) updates, wherein the wireless device is communicating with the base station using a contiguous subset of physical resources on a first carrier in accordance with particular embodiments, the method begins at step W02 with obtaining an indication of a subset of a plurality of paging occasions in a SI modification period that the wireless device is configured to monitor, wherein responsive to an upcoming update of SI the base station is configured to transmit a notification on each of the plurality of paging occasions in the SI modification period; and moves on to step W04 with monitoring the subset of the plurality of paging occasions for notifications of upcoming SI updates.

FIG. 13 illustrates a method in accordance with some embodiments.

FIG. 13 depicts a method performed by a wireless device for updated system information (SI) from a base station from a base station, wherein the wireless device is communicating with the base station using a contiguous subset of physical resources on a first carrier in accordance with particular embodiments, the method begins at step 1302 with receiving an indication of an upcoming SI update from the base station; wherein the indication is received on physical resources within the contiguous subset of physical resources.

Figure 14:
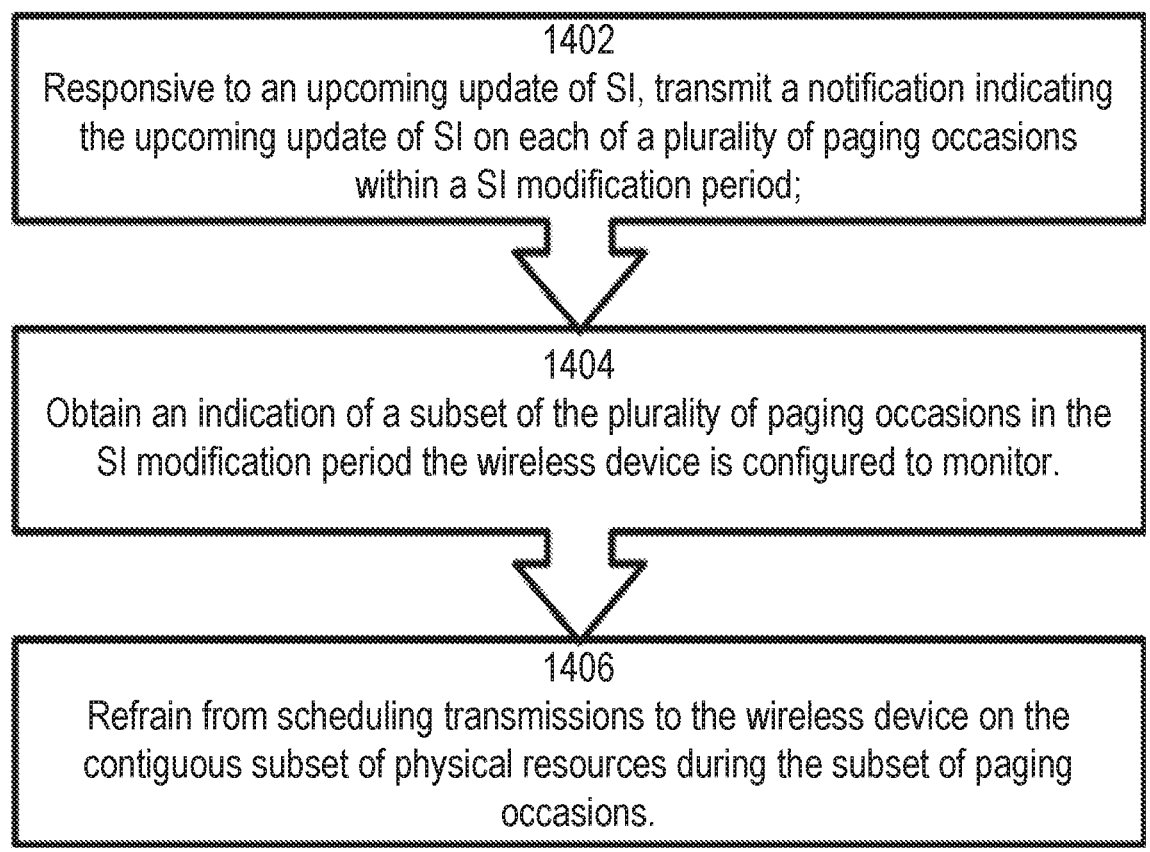
FIG. 14 illustrates a method in accordance with some embodiments.

FIG. 14 illustrates a method in accordance with some embodiments.

FIG. 14 depicts a method performed by a base station for transmitting to a wireless device a notification of updated system information (SI), wherein the wireless device is communicating with the base station using a contiguous subset of physical resources on a first carrier in accordance with particular embodiments, the method begins at step 1402 with responsive to an upcoming update of SI, transmitting a notification indicating the upcoming update of SI on each of a plurality of paging occasions within a SI modification period; then it moves to step 1404 with obtaining an indication of a subset of the plurality of paging occasions in the SI modification period the wireless device is configured to monitor; and then to step 1406 with refraining from scheduling transmissions to the wireless device on the contiguous subset of physical resources during the subset of paging occasions.

FIG. 15 illustrates a method in accordance with some embodiments.

FIG. 15 depicts a method performed by a base station for transmitting updated system information (SI) to a wireless device, wherein the wireless device is communicating with the base station using a contiguous subset of physical resources on a first carrier in accordance with particular embodiments, the method begins at step 1502 with transmitting an indication of an upcoming SI update to the wireless device; wherein the indication is transmitted on physical resources within the contiguous subset of physical resources.

Figure 16:
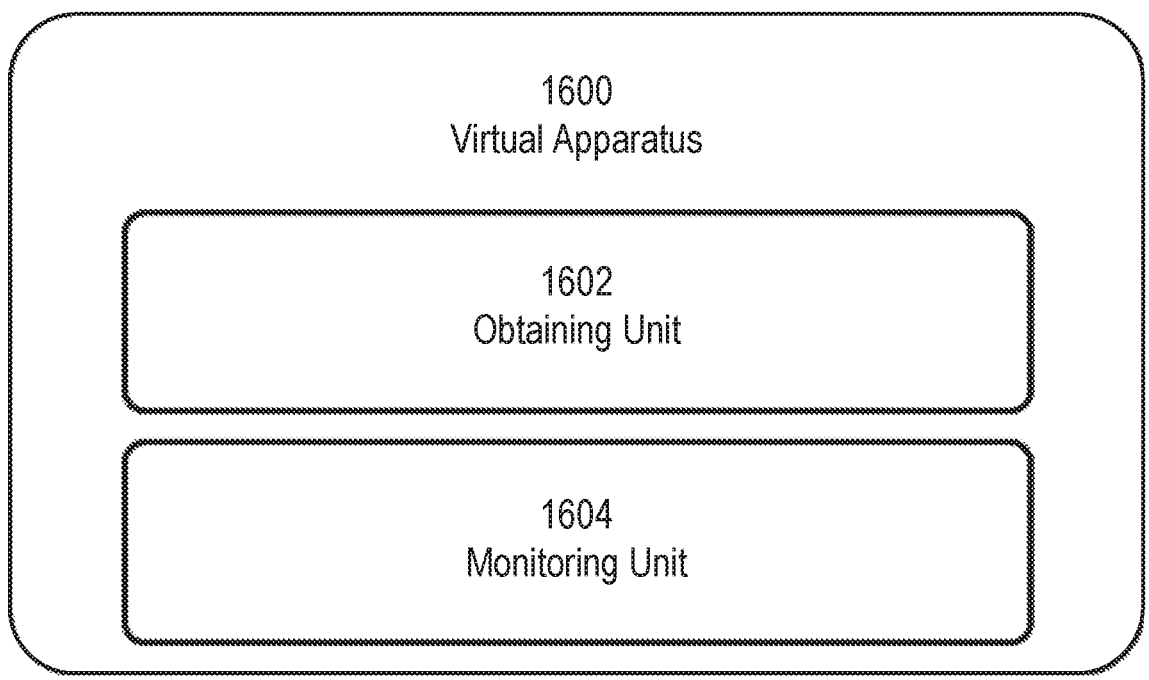
FIG. 16 illustrates a virtualization apparatus in accordance with some embodiments.

FIG. 16 illustrates a virtualization apparatus in accordance with some embodiments;

FIG. 16 illustrates a schematic block diagram of an wireless device 1600 in a wireless network (for example, the wireless network shown in FIG. 3). The apparatus may be implemented in a wireless device or network node (e.g., wireless device 310 or network node 360 shown in FIG. 3). Apparatus 1600 is operable to carry out the example method described with reference to FIG. 12 and possibly any other processes or methods disclosed herein. It is also to be understood that the method of FIG. 12 is not necessarily carried out solely by apparatus 1600. At least some operations of the method can be performed by one or more other entities.

Virtual Apparatus 1600 may comprise processing circuitry, which may include one or more microprocessor r microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 1602 and monitoring unit WW04, and any other suitable units of apparatus 1600 to perform corresponding functions according one or more embodiments of the present disclosure.

As illustrated in FIG. 16, apparatus 1600 includes obtaining unit 1602 and monitoring unit 1604. Obtaining unit 1602 may be configured to obtain an indication of a subset of a plurality of paging occasions in a SI modification period that the wireless device is configured to monitor, wherein responsive to an upcoming update of SI the base station is configured to transmit a notification on each of the plurality of paging occasions in the SI modification period. Monitoring unit 1604 may be configured to monitor the subset of the plurality of paging occasions for notifications of upcoming SI updates.

Figure 17:
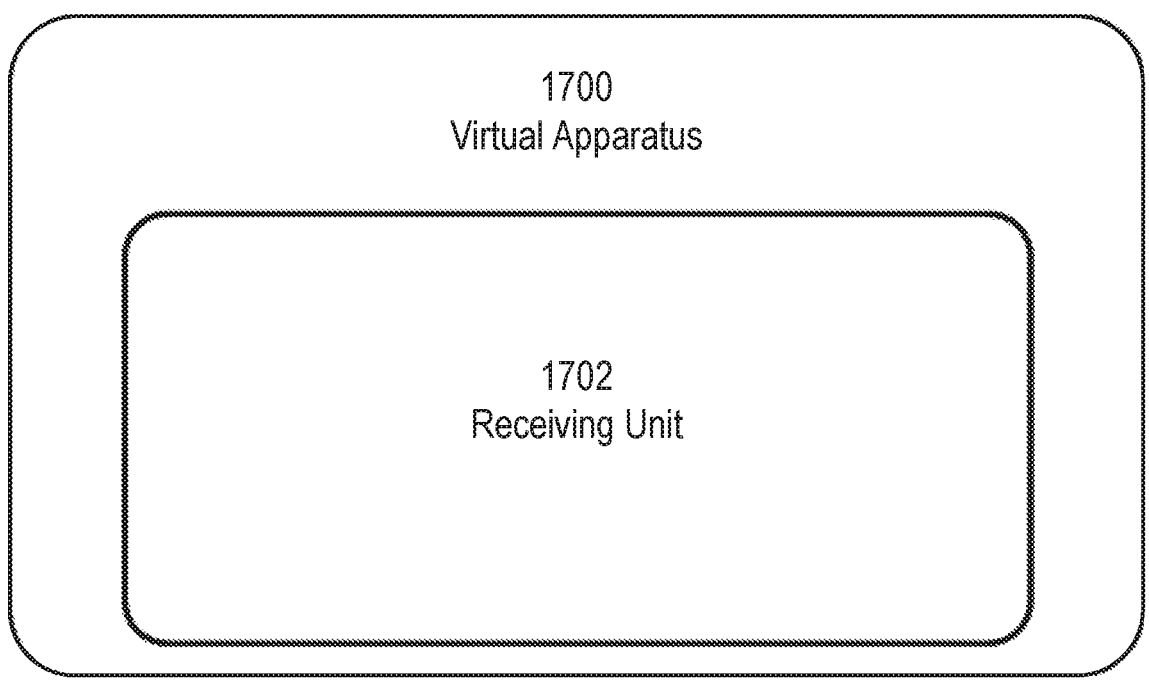
FIG. 17 illustrates a virtualization apparatus in accordance with some embodiments.

FIG. 17 illustrates a visualization apparatus in accordance with some embodiments.

FIG. 17 illustrates a schematic block diagram of an wireless device 1700 in a wireless network (for example, the wireless network shown in FIG. 3). The apparatus may be implemented in a wireless device or network node (e.g., wireless device 310 or network node 360 shown in FIG. 3). Apparatus 1700 is operable to carry out the example method described with reference to FIG. 13 and possibly any other processes or methods disclosed herein. It is also to be understood that the method of FIG. 13 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations; the processing circuitry may be used to cause receiving unit 1702, and any other suitable units of apparatus 1700 to perform corresponding functions according one or more embodiments of the present disclosure.

As illustrated in FIG. 17, apparatus 1700 includes receiving unit 1702. Receiving unit 1702 may be configured to receive an indication of an upcoming SI update from the base station; wherein the indication is received on physical resources within the contiguous subset of physical resources.

Figure 18:
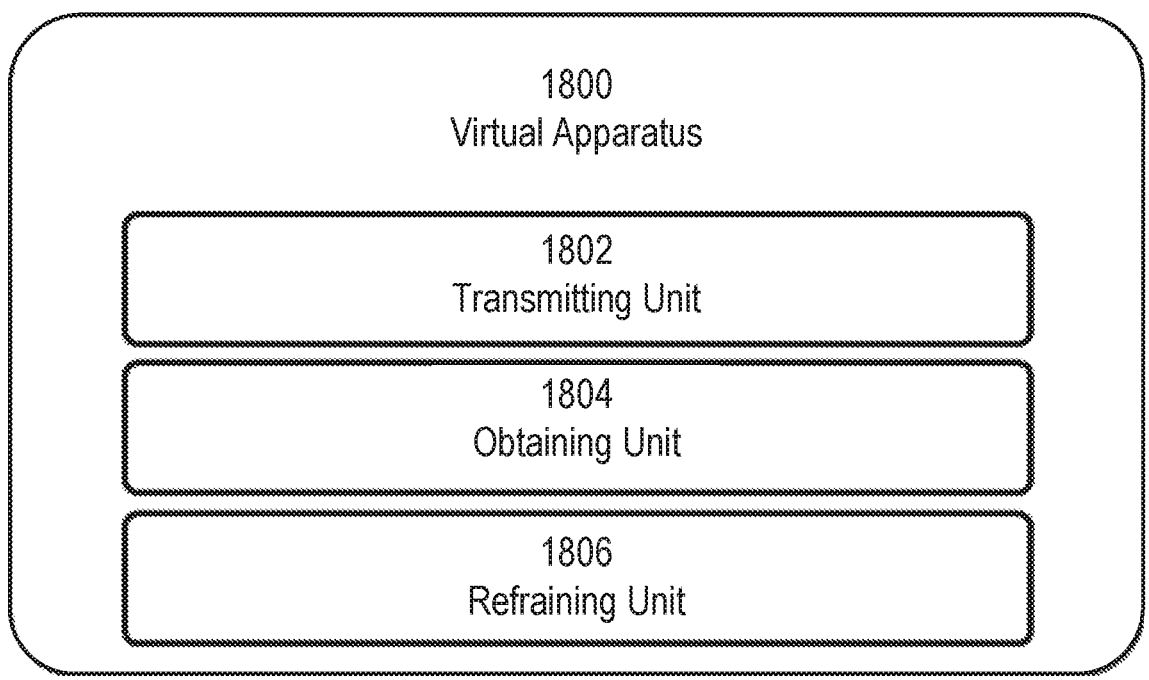
FIG. 18 illustrates a virtualization apparatus in accordance with some embodiments.

FIG. 18 illustrates a virtualization apparatus in accordance with some embodiments FIG. 18 illustrates a schematic block diagram of an wireless device 1800 in a wireless network (for example, the wireless network shown in FIG. 3). The apparatus may be implemented in a wireless device or network node (e.g., wireless device 310 or network node 360 shown in FIG. 3). Apparatus 1800 is operable to carry out the example method described with reference to FIG. 14 and possibly any other processes or methods disclosed herein. It is also to be understood that the method of FIG. 14 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 1802, obtaining unit 1804 and refraining unit 1804, and any other suitable units of apparatus 1800 to perform corresponding functions according one or more embodiments of the present disclosure.

As illustrated in FIG. 18, apparatus 1800 includes transmitting unit 1802, obtaining unit 1804 and refraining unit 1804. Transmitting unit 1802 may be configured to responsive to an upcoming update of SI, transmit a notification indicating the upcoming update of SI on each of a plurality of paging occasions within a SI modification period. Obtaining unit 1804 may be configured to obtain an indication of a subset of the plurality of paging occasions in the SI modification period the wireless device is configured to monitor. Refraining Unit 1806 may be configured to refrain from scheduling transmissions to the wireless device on the contiguous subset of physical resources during the subset of paging occasions.

Figure 19:
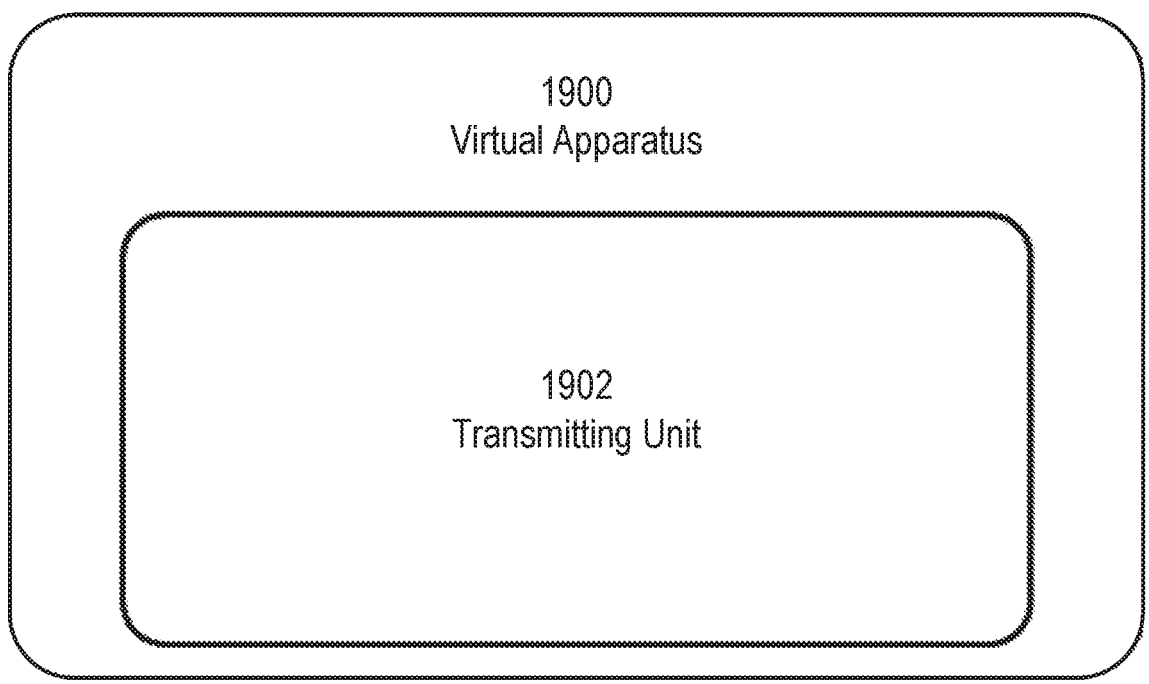
FIG. 19 illustrates a virtualization apparatus in accordance with some embodiments.

FIG. 19 illustrates a virtualization apparatus in accordance with some embodiments FIG. 19 illustrates a schematic block diagram of an wireless device 1900 in a wireless network (for example, the wireless network shown in FIG. 3). The apparatus may be implemented in a wireless device or network node (e.g., wireless device 310 or network node 360 shown in FIG. 3). Apparatus 1900 is operable to carry out the example method described with reference to FIG. 15 and possibly any other processes or methods disclosed herein. It is also to be understood that the method of FIG. 15 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 1902, and any other suitable units of apparatus 1900 to perform corresponding functions according one or more embodiments of the present disclosure.

As illustrated in FIG. 19, apparatus 1900 includes transmitting unit 1902. Transmitting unit 1902 may be configured to transmit an indication of an upcoming SI update to the wireless device; wherein the indication is transmitted on physical resources within the contiguous subset of physical resources.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Group A Embodiments

1. A method performed by a wireless device for receiving notifications from a base station of upcoming system information (SI) updates, wherein the wireless device is communicating with the base station using a contiguous subset of physical resources on a first carrier, the method comprising:
    obtaining an indication of a subset of a plurality of paging occasions in a SI modification period that the wireless device is configured to monitor, wherein responsive to an upcoming update of SI the base station is configured to transmit a notification on each of the plurality of paging occasions in the SI modification period; and
    monitoring the subset of the plurality of paging occasions for notifications of upcoming SI updates.
2. The method of embodiment 1 wherein the step of obtaining comprises:
    a. receiving the indication from the base station.
3. The method of embodiment 1 wherein the step of obtaining comprises:
    a. determining the indication based on category or capability information associated with the wireless device.
4. The method of embodiment 1 to 3 wherein the subset of the plurality of paging occasions in the SI modification period is a last paging occasion in the SI modification period.
5. The method of embodiment 1 to 3 wherein the subset of the plurality of paging occasions in the SI modification period comprises evenly distributed paging occasions in the SI modification period.
6. A method performed by a wireless device for receiving updated system information (SI) from a base station, wherein the wireless device is communicating with the base station using a contiguous subset of physical resources on a first carrier, the method comprising:
    receiving an indication of an upcoming SI update from the base station; wherein the indication is received on physical resources within the contiguous subset of physical resources.
7. The method as in embodiment 6 wherein the indication comprises a paging message received on a dedicated paging channel within the contiguous subset of physical resources.
8. The method as in embodiment 6 wherein the indication comprises a message received on a physical downlink control channel (PDCCH) within the contiguous subset of physical resources.
9. The method as in embodiment 6 wherein the indication comprises dedicated RRC signaling.
10. The method as in any one of embodiment 6 to 9 wherein the indication comprises information relating to one or more of: which system information blocks are to be updated and/or new value tags associated with system information blocks which are to be updated.

11. The method as in any one of embodiments 6 to 10 further comprising:
   a. responsive to receiving the indication, monitoring physical resources outside of the contiguous subset of physical resources to receive the updated SI,
12. The method as in embodiment 11 wherein the indication comprises information relating to a time period during which a message relating to the updated system information will be transmitted on physical resources outside of the contiguous subset of physical resources.
13. The method as in embodiment 12 wherein the indication further comprises information relating to frequency resources to be used to transmit the message relating to the updated system information.
14. The method as in embodiment 11 wherein the indication comprises a scheduling allocation for an SI message, wherein the scheduling allocation is received using a physical downlink control channel within the contiguous subset of physical resources.
15. The method as in any one of embodiments 6 to 10 further comprising:
   a. responsive to receiving the indication, receiving a broadcast of the updated SI on physical resources within the contiguous subset of physical resources to receive the updated system information.
16. The method as in embodiment 15 further comprising:
   a. responsive to receiving the indication, transmitting a request to the base station to broadcast the updated SI using physical resources within the contiguous subset of physical resources.
17. The method as in embodiment 16 further comprising:
   a. transmitting the request using Radio Resource Control signaling,
18. The method as in embodiment 15 to 17 wherein the broadcast is received on a subset of a plurality of paging occasions within a system information modification period.
19. The method as in embodiment 6 to 10 further comprising receiving the updated SI on dedicated Radio Resource Control (RRC) signaling.
20. The method as in embodiment 19 further comprising receiving the updated SI responsive to transmitting a request to the base station to transmit the updated SI,
21. The method of any of the previous embodiments, further comprising:
   providing user data; and
   forwarding the user data to a host computer via the transmission to the base station.

Group B Embodiments

22. A method performed by a base station for transmitting to a wireless device a notification of updated system information (SI), wherein the wireless device is communicating with the base station using a contiguous subset of physical resources on a first carrier, the method comprising:
   a. responsive to an upcoming update of SI, transmitting a notification indicating the upcoming update of SI on each of a plurality of paging occasions within a SI modification period;
   b. obtaining an indication of a subset of the plurality of paging occasions in the SI modification period the wireless device is configured to monitor; and
   c. refraining from scheduling transmissions to the wireless device on the contiguous subset of physical resources during the subset of paging occasions.
23. The method as in embodiment 22 wherein the step of obtaining comprises receiving an indication from the wireless device of the subset of the plurality of paging occasions.
24. The method as in embodiment 22 wherein the step of obtaining comprises determining the subset of the plurality of paging occasions based on category or capability information associated with the wireless device.
25. The method as in embodiment 22 or 24 further comprising transmitting an indication of the subset of the plurality of paging occasions to the wireless device.
26. The method of embodiment 22 to 25 wherein subset of the plurality of paging occasions in the SI modification period is a last paging occasion in the SI modification period,
27. The method of embodiment 22 to 25 wherein the subset of the plurality of paging occasions in the SI modification period comprises evenly distributed paging occasions in the SI modification period.
28. A method performed by a base station for transmitting updated system information (SI) to a wireless device, wherein the wireless device is communicating with the base station using a contiguous subset of physical resources on a first carrier, the method comprising:
   transmitting an indication of an upcoming SI update to the wireless device; wherein the indication is transmitted on physical resources within the contiguous subset of physical resources.
29. The method as in embodiment 28 wherein the indication comprises a paging message transmitted on a dedicated paging channel within the contiguous subset of physical resources.
30. The method as in embodiment 28 wherein the indication comprises a message transmitted on a physical downlink control channel (PDCCH) within the contiguous subset of physical resources.
31. The method as in embodiment 29 or 30 wherein the indication is transmitted to a plurality of wireless devices communicating with the base station using the contiguous subset of physical resources, and wherein the indication is transmitted during each of a plurality of paging occasions within a SI modification period.
32. The method as in embodiment 29 or 30 wherein the indication is transmitted to a plurality of wireless devices communicating with the base station using the contiguous subset of physical resources, and wherein the indication is transmitted during a time period during which the base station is aware that one or more of the plurality of wireless devices is monitoring the contiguous subset of physical resources.
33. The method as in embodiment 28 wherein the indication comprises dedicated RRC signaling.
34. The method as in any one of embodiment 28 to 33 wherein the indication comprises information relating to one or more of: which system information blocks are to be updated and/or new value tags associated with system information blocks which are to be updated.
35. The method as in any one of embodiments 28 to 34 further comprising:
   a. transmitting the updated SI using physical resources outside of the contiguous subset of physical resources.
36. The method as in embodiment 35 wherein the indication comprises information relating to a time period during which a message relating to the updated SI will be transmitted on physical resources outside of the contiguous subset of physical resources.

37. The method as in embodiment 36 wherein the indication further comprises information relating to frequency resources to be used to transmit the message relating to the updated system information.
38. The method as in embodiment 35 wherein the indication comprises a scheduling allocation for an SI message, wherein the scheduling allocation is transmitted using a physical downlink control channel within the contiguous subset of physical resources.
39. The method as in any one of embodiments 28 to 34 further comprising:
    a transmitting a broadcast of the updated SI on physical resources within the contiguous subset of physical resources.
40. The method as in embodiment 39 further comprising:
    a. transmitting the broadcast responsive to receiving a request to broadcast the updated SI from the wireless device.
41. The method as in embodiment 40 further comprising:
    a. Receiving the request on Radio Resource Control signaling.
42. The method as in embodiment 39 to 41 wherein the broadcast is transmitted on a subset of a plurality of paging occasions within a system information modification period.
43. The method as in embodiment 28 to 34 further comprising transmitting the updated SI on dedicated Radio Resource Control (RRC) signaling.
44. The method as in embodiment 43 further comprising transmitting the updated SI responsive to receiving a request from the wireless device to transmit the updated SI.
45. The method of any of the previous embodiments, further comprising:
    obtaining user data; and
    forwarding the user data to a host computer or a wireless device.

Group C Embodiments

46. A wireless device for receiving updated system information (SI) from a base station, the wireless device comprising:
    processing circuitry configured to perform any of the steps of any of the Group A embodiments; and
    power supply circuitry configured to supply power to the wireless device.
47. A base station for transmitting updated system information (SI) to a wireless device, the base station comprising:
    processing circuitry configured to perform any of the steps of any of the Group B embodiments;
    power supply circuitry configured to supply power to the base station.
48. A user equipment (UE) for receiving updated system information (SI) from a base station, the UE comprising:
    an antenna configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;
    an input interface connected to the processing circuitry and configured to allow input of information into the UE to be processed by the processing circuitry;
    an output interface connected to the processing circuitry and configured to output information from the UE that has been processed by the processing circuitry; and
    a battery connected to the processing circuitry and configured to supply power to the UE.
49. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.
50. The communication system of the previous embodiment further including the base station.
51. The communication system of the previous 2 embodiments, further including the UE, wherein the UE is configured to communicate with the base station.
52. The communication system of the previous 3 embodiments, wherein:
    the processing circuitry of the host computer is configured to execute a host application, thereby providing the user data; and
    the UE comprises processing circuitry configured to execute a client application associated with the host application,
53. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.
54. The method of the previous embodiment, further comprising, at the base station, transmitting the user data.
55. The method of the previous 2 embodiments, wherein the user data is provided at the host computer by executing a host application, the method further comprising, at the UE, executing a client application associated with the host application.
56. A user equipment (UE) configured to communicate with a base station, the UE comprising a radio interface and processing circuitry configured to performs the of the previous 3 embodiments.
57. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
58. The communication system of the previous embodiment, wherein the cellular network further includes a base station configured to communicate with the UE.
59. The communication system of the previous 2 embodiments, wherein;
    the processing circuitry of the host computer is configured to execute a host application, thereby providing the user data; and the UE's processing circuitry is configured to execute a client application associated with the host application.

60. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.

61. The method of the previous embodiment, further comprising at the UE, receiving the user data from the base station.

62. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.

63. The communication system of the previous embodiment, further including the UE.

64. The communication system of the previous 2 embodiments, further including the base station, wherein the base station comprises a radio interface configured to communicate with the UE and a communication interface configured to forward to the host computer the user data carried by a transmission from the UE to the base station.

65. The communication system of the previous 3 embodiments, wherein:
    the processing circuitry of the host computer is configured to execute a host application; and
    the UE's processing circuitry is configured to execute a client application associated with the host application, thereby providing the user data.

66. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.

67. A method implemented in a communication system including a host computer, a base station and a user equipment (UE), the method comprising:
    at the host computer, receiving user data transmitted to the base station from the UE, wherein the UE performs any of the steps of any of the Group A embodiments.

68. The method of the previous embodiment, further comprising, at the UE, providing the user data to the base station.

69. The method of the previous 2 embodiments, further comprising:
    at the UE, executing a client application, thereby providing the user data to be transmitted; and
    at the host computer, executing a host application associated with the client application.

70. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

71. A communication system including a host computer comprising a communication interface configured to receive user data originating torn a transmission torn a user equipment (UE) to a base station, wherein the base station comprises a radio interlace and processing circuitry, the base station's processing circuitry configured to perform any of the steps of any of the Group B embodiments.

72. The communication system of the previous embodiment further including the base station.

73. The communication system of the previous 2 embodiments, further including the UE, wherein the UE is configured to communicate with the base station.

74. The communication system of the previous 3 embodiments, wherein:
    the processing circuitry of the host computer is configured to execute a host application;
    the UE is configured to execute a client application associated with the host application, thereby providing the user data to be received by the host computer.

75. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.

76. The method of the previous embodiment, further comprising at the base station, receiving the user data from the UE.

77. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP $3^{rd}$ Generation Partnership Project
5G $5^{th}$ Generation
BWP Bandwidth Part
CMAS Commercial Mobile Alert System
CORESET Control Resource Set
CRC Cyclic Redundancy Check
DCI Downlink Control information
Dl Downlink
DRX Discontinuous Reception
EAB Extended Access Barring
eNB Evolved NodeB
ETWS Earthquake and Tsunami Warning System
gNB The term for a radio base station in NR (corresponding to eNB in LTE).
ID Identity/Identifier
LTE Long Term Evolution
MIB Master Information Block
Msg Message MTC Machine Type Communication
NGC Next Generation Core
NR New Radio (The term used for the 5G radio interface and radio access network in the technical reports and standard specifications 3GPP are working on.)
PBCH Physical Broadcast Channel
PCI Physical Cell Identity
PDCCH Physical Downlink Control Channel
PDSCH Physical Downlink Shared Channel
PRACH Physical Random Access Channel
PSS Primary Synchronization Signal
QCL Quasi-Co-Located
RA Random Access
RAR Random Access Response
RAN Random Access Network
RMSI Remaining Minimum System Information
RRC Radio Resource Control
RNTI Radio Network Temporary Identifier
SFN Single Frequency Network
SI System Information
SIB System Information Block
SS Synchronization Signal
SSS Secondary Synchronization Signal
SI-RNTI System Information RNTI
TRP Transmission/Reception Point
UE User Equipment
UL Uplink
UTC Coordinated Universal Time
EAB Extended Access Barring
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel impulse Response
CP Cyclic Prefix
CPICH Common Pilot. Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC Evolved-Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for receiving notifications from a base station of upcoming system information (SI) updates, wherein the wireless device is communicating with the base station using physical resources on a bandwidth part of a first carrier, the method comprising:
    obtaining an indication of a subset of a plurality of paging occasions in a SI modification period that the wireless device is configured to monitor, wherein responsive to an upcoming update of SI the base station is configured to transmit a notification on each of the plurality of paging occasions in the SI modification period; and
    monitoring the subset of the plurality of paging occasions for notifications of upcoming SI updates, wherein the subset of the plurality of paging occasions in the SI modification period is a last paging occasion in the SI modification period.

2. The method of claim 1, wherein the step of obtaining comprises one of:
    receiving the indication from the base station, or
    determining the indication based on category or capability information associated with the wireless device.

3. A method performed by a wireless device for receiving updated system information (SI) from a base station, wherein the wireless device is communicating with the base station using physical resources on a bandwidth part of a first carrier, the method comprising:
    receiving an indication of an upcoming SI update from the base station wherein the indication is received on physical resources within the bandwidth part; and
    responsive to receiving the indication, monitoring physical resources outside of the bandwidth part to receive the updated SI.

4. The method of claim 3, wherein the indication comprises any one of the following:
    a paging message received on a dedicated paging channel within the bandwidth part;
    a message received on a physical downlink control channel (PDCCH) within the bandwidth part; and
    dedicated RRC signaling.

5. The method of claim 3, wherein the indication comprises information relating to one or more of: which system information blocks are to be updated and/or new value tags associated with system information blocks which are to be updated.

6. The method of claim 3, wherein the physical resources outside of the bandwidth part comprise an initial bandwidth part.

7. The method of claim 3, wherein the indication comprises any one or more of the following:
    information relating to a time period during which a message relating to the updated system information will be transmitted on physical resources outside of the bandwidth part;
    information relating to frequency resources to be used to transmit the message relating to the updated system information; and
    a scheduling allocation for an SI message, wherein the scheduling allocation is received using a physical downlink control channel within the bandwidth part.

8. The method of claim 3, further comprising any one or more of the following:
    responsive to receiving the indication, receiving a broadcast of the updated SI on physical resources within the bandwidth part to receive the updated system information; and
    responsive to receiving the indication, transmitting a request to the base station to broadcast the updated SI using physical resources within the bandwidth part.

9. A method performed by a base station for transmitting to a wireless device a notification of updated system information (SI), wherein the wireless device is communicating with the base station using physical resources on a bandwidth part of a first carrier, the method comprising:
    responsive to an upcoming update of SI, transmitting a notification indicating the upcoming update of SI on each of a plurality of paging occasions within a SI modification period;
    obtaining an indication of a subset of the plurality of paging occasions in the SI modification period the wireless device is configured to monitor, wherein the subset of the plurality of paging occasions in the SI modification period is a last paging occasion in the SI modification period; and
    refraining from scheduling transmissions to the wireless device within the bandwidth part during the subset of paging occasions.

10. The method of claim 9, wherein the step of obtaining comprises receiving an indication from the wireless device of the subset of the plurality of paging occasions.

11. The method of claim 9, wherein the step of obtaining comprises determining the subset of the plurality of paging occasions based on category or capability information associated with the wireless device.

12. The method of claim 9, further comprising transmitting an indication of the subset of the plurality of paging occasions to the wireless device.

13. A method performed by a base station for transmitting updated system information (SI) to a wireless device, wherein the wireless device is communicating with the base station using physical resources on a bandwidth part of a first carrier, the method comprising:
    transmitting an indication of an upcoming SI update to the wireless device, wherein the indication is transmitted on physical resources within the bandwidth part; and
    transmitting the updated SI using physical resources outside of the bandwidth part.

14. The method of claim 13, wherein the indication comprises one of the following:
- a paging message transmitted on a dedicated paging channel within the bandwidth part; or
- a message transmitted on a physical downlink control channel (PDCCH) within the bandwidth part.

15. The method of claim 13, wherein the indication is transmitted to a plurality of wireless devices communicating with the base station using bandwidth part, and, wherein the indication is transmitted during each of a plurality of paging occasions within a SI modification period.

16. The method of claim 13, wherein the indication is transmitted to a plurality of wireless devices communicating with the base station using the bandwidth part, and, wherein the indication is transmitted during a time period during which the base station is aware that one or more of the plurality of wireless devices is monitoring the bandwidth part.

17. The method of claim 13, wherein the indication comprises information relating to any one or more of the following
- which system information blocks are to be updated;
- new value tags associated with system information blocks which are to be updated,
- a time period during which a message relating to the updated SI will be transmitted on physical resources outside of the bandwidth part;
- frequency resources to be used to transmit the message relating to the updated system information,
- a scheduling allocation for an SI message, wherein the scheduling allocation is transmitted using a physical downlink control channel within the bandwidth part.

18. The method of claim 13, further comprising:
- transmitting a broadcast of the updated SI on physical resources within the bandwidth part, or
- transmitting the broadcast responsive to receiving a request to broadcast the updated SI from the wireless device.

19. A method performed by a base station for transmitting updated system information (SI) to a wireless device, wherein the wireless device is communicating with the base station using physical resources on a bandwidth part of a first carrier, the method comprising:
transmitting an indication of an upcoming SI update to the wireless device; wherein the indication is transmitted on physical resources within the bandwidth part, wherein the indication is transmitted to a plurality of wireless devices communicating with the base station using the bandwidth part, and, wherein the indication is transmitted during a time period during which the base station is aware that one or more of the plurality of wireless devices is monitoring the bandwidth part.

* * * * *